(12) United States Patent
Biffar

(10) Patent No.: US 6,397,212 B1
(45) Date of Patent: May 28, 2002

(54) SELF-LEARNING AND SELF-PERSONALIZING KNOWLEDGE SEARCH ENGINE THAT DELIVERS HOLISTIC RESULTS

(75) Inventor: Peter Biffar, 1060 High St., Palo Alto, CA (US) 94301

(73) Assignee: Peter Biffar, Palo Alto, CA (US)

( * ) Notice: Subject to any disclaimer, the term of this patent is extended or adjusted under 35 U.S.C. 154(b) by 0 days.

(21) Appl. No.: 09/262,953

(22) Filed: Mar. 4, 1999

(51) Int. Cl.[7] ............................................. G06F 17/30
(52) U.S. Cl. .................................. 707/5; 707/10; 705/7
(58) Field of Search ................. 707/5, 6, 10; 705/7–11, 705/35–38, 14, 26

(56) References Cited

U.S. PATENT DOCUMENTS

| | | | |
|---|---|---|---|
| 4,799,156 A | 1/1989 | Shavit et al. | 364/401 |
| 4,930,011 A | 5/1990 | Kiewit | 358/84 |
| 4,992,940 A | 2/1991 | Dworkin | 364/901 |
| 5,260,778 A | 11/1993 | Kauffman et al. | 358/142 |
| 5,446,891 A | 8/1995 | Kaplan et al. | 395/600 |
| 5,446,919 A | 8/1995 | Wilkins | 455/6.2 |
| 5,504,675 A | 4/1996 | Cragun et al. | 364/401 |
| 5,515,098 A | 5/1996 | Carles | 348/8 |
| 5,636,346 A | 6/1997 | Saxe | 395/201 |
| 5,664,115 A | 9/1997 | Fraser | 364/401 |
| 5,694,546 A | 12/1997 | Reisman | 395/200 |
| 5,699,526 A | 12/1997 | Siefert | 395/227 |
| 5,757,917 A | 5/1998 | Rose et al. | 380/25 |
| 5,758,328 A | 5/1998 | Giovannoli | 705/26 |
| 5,794,210 A * | 8/1998 | Goldhaber et al. | 705/14 |
| 5,796,395 A | 8/1998 | de Hond | 345/331 |
| 5,799,157 A | 8/1998 | Escallon | 395/227 |
| 5,799,284 A | 8/1998 | Bourquin | 705/26 |
| 5,812,134 A | 9/1998 | Pooser et al. | 345/356 |
| 5,848,396 A | 12/1998 | Gerace | 705/10 |
| 6,260,192 B1 * | 7/2001 | Rosin et al. | 725/39 |

FOREIGN PATENT DOCUMENTS

| | | | |
|---|---|---|---|
| EP | 0709997 | 5/1996 | H04M/3/50 |
| EP | 0809221 | 11/1997 | G07F/17/16 |

OTHER PUBLICATIONS

"An Intelligent Agent for Multimedia Newspaper," Kwan, W. and A. Karmouch, IEEE Catalog No.: 95TH8103, Conference on Electrical and Computer Engineering, Sep. 5–8, 1995, vol. 1, pp. 594–597.*

* cited by examiner

*Primary Examiner*—Hosain T. Alam
(74) *Attorney, Agent, or Firm*—Michael A. Glenn; Kirk D. Wong

(57) ABSTRACT

A search engine provides intelligent multi-dimensional searches, in which the search engine always presents a complete, holistic result, and in which the search engine presents knowledge (i.e. linked facts) and not just information (i.e. facts). The search engine is adaptive, such that the search results improve over time as the system learns about the user and develops a user profile. Thus, the search engine is self personalizing, i.e. it collects and analyzes the user history, and/or it has the user react to solutions and learns from such user reactions. The search engine generates profiles, e.g. it learns from all searches of all users and combines the user profiles and patterns of similar users. The search engine accepts direct user feedback to improve the next search iteration One feature of the invention is locking/unlocking, where a user may select specific attributes that are to remain locked while the search engine matches these locked attributes to all unlocked attributes. The user may also specify details about characteristics, provide and/or receive qualitative ratings of an overall result, and introduce additional criteria to the search strategy or select a search algorithm. Additionally, the system can be set up such that it does not require a keyboard and/or mouse interface, e.g. it can operate with a television remote control or other such human interface.

57 Claims, 23 Drawing Sheets

| 1200 Characteristic | 1300 Information |
|---|---|
| Type | Sport Utility |
| Brand | Mercedes |
| Price Range | $34,000 |
| Engine Size | ML 320, V6, 215 hp, and other information |
| Option Package | M1, leather trimmed seats, digital trip computer, etc |
| Color | white |
| Other Options | Third row |
| Other Information | Any information |

1100 Item

| | | 1 | 2 | 3 | 4 | 5 | 6 | 7 | 8 | 9 |
|---|---|---|---|---|---|---|---|---|---|---|
| A1 | Type | Sport Utility | Sport Utility | Sport Utility | Sport Utility | Sport Utility | Sport Utility | Sport Utility | Sport Utility | Sport Utility |
| A2 | Brand | Mercedes | Mercedes | Mercedes | Mercedes | Mercedes | Mercedes | Mercedes | Mercedes | Mercedes |
| A3 | Price | 40 | 45 | 44 | 50 | 45 | 47 | 49 | 44 | 45.5 |
| B1 | Engine Size | 6 cylinder | 8 cylinder | 6 cylinder | 8 cylinder | 8 cylinder | 8 cylinder | 8 cylinder | 6 cylinder | 6 cylinder |
| B2 | Option Package | standard | standard | delux | delux | standard | standard | standard | standard | delux |
| C1 | Color | white | white | white | white | black | green metallic | green metallic | green metallic | silver |
| C2 | other options | none | none | none | none | none | none | third row | third row | third row |

*FIG. 6A*

|    |                | 10           | 11           | 12           | 13           | 14           | 15             | 16             | 17             | 18             |
|----|----------------|--------------|--------------|--------------|--------------|--------------|----------------|----------------|----------------|----------------|
| A1 | Type           | Sport Utility| Sport Utility| Sport Utility| Sport Utility| Sport Utility| Sport Utility  | Sport Utility  | Sport Utility  | Sport Utility  |
| A2 | Brand          | Durango      | Durango      | Durango      | Durango      | Durango      | Durango        | Durango        | Durango        | Durango        |
| A3 | Price          | 28           | 34           | 28           | 40           | 35           | 37             | 39             | 34             | 34             |
| B1 | Engine Size    | 6 cylinder   | 8 cylinder   | 6 cylinder   | 8 cylinder   | 8 cylinder   | 8 cylinder     | 8 cylinder     | 6 cylinder     | 6 cylinder     |
| B2 | Option Package | standard     | standard     | standard     | delux        | standard     | standard       | standard       | standard       | standard       |
| C1 | Color          | white        | white        | white        | white        | black        | green metallic | green metallic | green metallic | red metallic   |
| C2 | other options  | third row    | third row    | third row    | third row    | third row    | third row      | third row      | third row      | third row      |

|    |                | 19           | 20           | 21           | 22           | 23           | 24             | 25             | 26             | 27             |
|----|----------------|--------------|--------------|--------------|--------------|--------------|----------------|----------------|----------------|----------------|
| A1 | Type           | Sport Utility| Sport Utility| Sport Utility| Sport Utility| Sport Utility| Sport Utility  | Sport Utility  | Sport Utility  | 4 Door         |
| A2 | Brand          | Explorer     | Jeep         | Jeep         | Jeep         | Jeep         | Jeep           | Jeep           | Jeep           | Ford Taurus    |
| A3 | Price          | 33           | 39           | 33           | 45           | 40           | 42             | 44             | 34             | 25             |
| B1 | Engine Size    | 6 cylinder   | 8 cylinder   | 6 cylinder   | 8 cylinder   | 8 cylinder   | 8 cylinder     | 8 cylinder     | 6 cylinder     | 6 cylinder     |
| B2 | Option Package | standard     | standard     | standard     | delux        | standard     | standard       | standard       | standard       | standard       |
| C1 | Color          | white        | white        | white        | white        | black        | green metallic | green metallic | green metallic | green metallic |
| C2 | other options  | none         | none         | none         | none         | none         | none           | none           | none           | none           |

*FIG. 6B*

FIG. 7M

SELF-LEARNING AND SELF-PERSONALIZING KNOWLEDGE SEARCH ENGINE THAT DELIVERS HOLISTIC RESULTS

BACKGROUND OF THE INVENTION

1. Technical Field

The invention relates to search engines. More particularly, the invention relates to a self-learning and self-personalizing knowledge search engine that delivers holistic results.

2. Description of the Prior Art

With the Internet, information, i.e. ". . . a collection of facts and data" (The American Heritage Dictionary of English Language) is becoming a commodity, such that nearly any fact can be found. Knowledge, i.e. a set of facts or information which are tied together by some logic module relationship, on the other hand is of high value.

Modern search technology is focused on surfacing facts. However, if a user desires knowledge rather than facts, the results of a search on the Internet using today's search engines or product wizards are often of little use. Such searches are typically key word based, using one or two words linked by Boolean logic module. The search engines typically provide a long list of headlines in accordance with these key words. These lists can contain tens of thousands of results.

The better search engines attempt to rank the results, using various methodologies such as frequency of a site visited. Thus, such search engines assume that a higher frequency of visitation is indication of value of information. Alternatively, such search engines may use some internal manual/automatic ranking system. The methods employed are not user specific. Each result typically provides a URL link to the Web page or site containing the information. The URLs must be activated for one site at a time. The user must then scan the Web page pointed to by the URL to determine if the desired information is found on that Web page. If it is not, then the user must select the next item in the list and continue this process until the desired result is found, or until the user simply gives up in frustration.

In typical search engine technology, the user is not able to provide the search engine with any feedback directly or indirectly that might help the search engine find a better result. Other than the key words, the user can not be more specific or multi-dimensional in describing the information for which he is searching.

One type of search engine is referred to as "Product wizards" or product finders, which are commonly used within Web sites of product vendors and merchants. These search engines are either:

Key word based search engines having a pull down window that shows all product names and/or product groups/categories. An alternative to such pull down windows are icons and product pictures, or lists with links. These methods are usually only useful and practical for small product selections;

Question based search engines for more complex products, in which the user must answer a set of questions before the system makes a recommendation. Frequently, as in the case with technical products, it is difficult for the user to answer a number of these questions; or Modular search engines, where the user must select a base model to which a number of options can then be added by using pull down windows. Based on the selection, a final price is then calculated. DELL computers has such as Web site. Unfortunately, when assembling a personal computer using such search engine, the user can not move between base models, e.g. between a desk top solution and a laptop, or even between one specific laptop series and another laptop series. Nor can the user lock an important feature, such as display size and/or price range, and seamlessly and easily compare solutions which satisfy those requirements.

The shortcomings of today's search engines are numerous:

All of the above search technologies require a keyboard/mouse interface and their use therefore is not available or limited in applications that provide a television remote control or other non-personal computer Internet devices.

Such other human interfaces are expected to proliferate rapidly over the next few years.

The user needs usually determine the search terms (i.e. key words). The user is not presented with solutions to which he can respond from among major characteristics given to him.

The above search technologies do not allow the user to provide any feedback, which would help the search engine to provide better searches in the next iteration. They are not iterative in the sense of moving from a first, coarse solution to a subsequent, fine solution.

The above search technologies do not learn about the searches of all users and the specific user to provide better assistance. That is, they are not adaptive.

None of the above search technologies allow for a simultaneous multi-dimensional search, which delivers a complete result, even if not all characteristics or parameters have been specified.

None of the above search technologies allow a user to vary simultaneously a number of major and minor characteristics, and at the same time lock in other characteristics.

None of the search engines allow the users to make easily trade off's. For example if a user selects a flight at a travel site such as Expedia, the search engine is able to find the lowest cost flight. However, the user can not easily explore—as would any experienced travel agent—other alternatives or "neighboring solutions" such as if the customer would return a day earlier, or would depart from the airport across town he could reduce the cost of the flight substantially.

None of the search technologies allow to summarize and present a number of searches for the same or similar product/service in a tabular form for user friendly comparison.

The shortcomings of today's methods result in a great level of frustration for the user and are neither natural nor intuitive.

A natural approach is usually more holistic and iterative. For example, a potential buyer comes to a used car lot where she finds many different models, and alternatives. The sales person, might not begin the sales process by asking the potential buyer a large number of questions to learn which car might be of interest to the potential customer. Instead, assuming the user provides a little guidance (verbal or non-verbal), the sales person takes a best guess regarding the needs of the potential customer. The sales person "sizes up" the potential buyer and her needs, i.e. he personalizes the search, comparing the few facts known/observed about the user, such as gender, age, and dress, against experience (i.e.

a personal, historic data base of all users), leads the person on the lot, and shows her a car (.e. a holistic solution). The buyer reacts about most important characteristics, e.g. "would prefer sports utility," "too expensive," "mileage ok," "like the brand," "a little expensive." Based on this information, the sales person picks a better fitting car (e.g. a next iteration), which again is a complete and holistic result. Again the buyer confirms some of the characteristics and might add a few more of the less important specifications (e.g. characteristics). "Yes like this one but do you have it in a different color, with a sunroof." Another car is presented. This car might not fulfill all specifications, but might be a good compromise considering the relative importance of the characteristics.

It would be advantageous to provide a search engine that was self-learning and self-personalizing, just as with the example of the car salesman above, such that a user was delivered holistic results.

SUMMARY OF THE INVENTION

The invention provides a search engine that allows for intelligent multi-dimensional searches, in which the search engine always presents a complete, holistic result, and in which the search engine presents knowledge (i.e. linked facts) and not just information (i.e. facts). The system is adaptive, such that the search results improve over time as the system learns about the user and develops a user profile. Thus, the search engine is self personalizing, i.e. it collects and analyzes the user history, e.g. it has the user react to solutions and learns from such user reactions. The search engine generates profiles, e.g. it learns from all searches of all users and combines the user profile and patterns of similar users. The search engine accepts direct user feedback to improve the next search iteration. The search engine receives multi-dimensional direct feed back.

One feature of the invention is locking/unlocking, where a user may select specific attributes that are to remain locked while the search engine matches these locked attributes to all unlocked attributes. The user may also specify details about characteristics, provide and/or receive qualitative ratings of an overall result, and introduce additional criteria to the search strategy.

Additionally, the system can be set up such that it does not require a keyboard and/or mouse interface, e.g. it can operate with a television remote control or other such human interface.

BRIEF DESCRIPTION OF THE DRAWINGS

FIG. 6 is a table that provides an example of a simple database;

DETAILED DESCRIPTION OF THE INVENTION

Figures 1, 2:
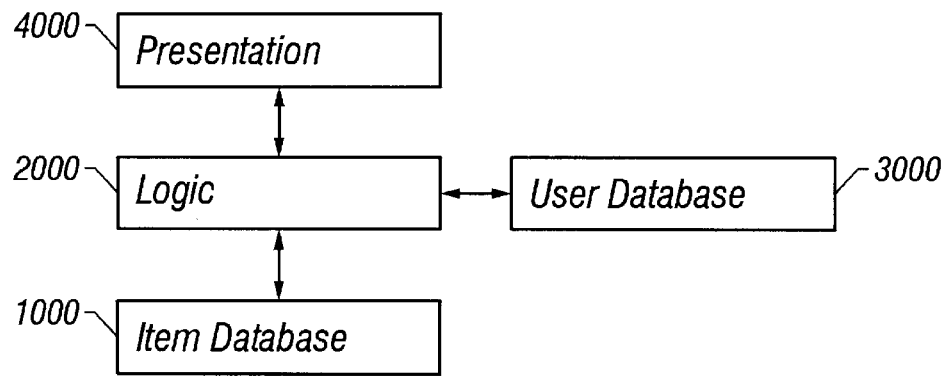
FIG. 1 is a block schematic diagram of a search engine according to the invention.
FIG. 2 is a block schematic diagram of an item database according to the invention.

FIG. 1 is a block schematic diagram of a search engine according to the invention. The search engine herein disclosed is a computer-based system comprising the following main elements:

An item database 1000, for example a local or remote database, or a virtual database or agent, such as implemented in XML, which contains the item for which a search is to be performed, logic module 2000 which determines those items that must be searched for in the database, a user database 3000 which stores searches of users, and a presentation module 4000 which displays the search result, as well as acting as the input for additional searches.

Item Database

FIG. 2 is a block schematic diagram of an item database according to the invention. In the presently preferred embodiment of the invention, each item 1100 which is stored in the item database 1000 comprises a complete product or service. Those skilled in the art will appreciate that an item may comprise other information. An item is described by the following:

One or many characteristics 1200. Similar items are structured along the same characteristics. For example, the characteristics could be for:

A book: author, title, publisher, year published, type of book (hard, soft cover), type of content (fiction/non-fiction), category (business, marketing, international), price. Characteristics for other media, such as videos, movies, and CDs are very similar.

A computer: type (e.g. desk top), processor, display, RAM, cache, hard Drive, drive, video, ports, sound, battery, extras, modem, data transfer, software bundle, pointing device, price (e.g. from DELL Home Systems Catalog December 1998).

A car: type (e.g. four door or sport utility), brand, price range, engine size, option package, color, and other options.

A real estate offering: location, type of real estate, price, size, types of room, type of structure, age of structure, and current rental income.

A vacation package: departure dates, destination, type of accommodation, flight information, type of services included, such as city tour and theater tickets.

A mutual fund: name, prospective objectives, portfolio manager, historical profile rating, performance, risk analysis, portfolio analysis, current analysis, such as funds are described by Morningstar and other services.

Not all items of an item group, such as books, must have all the same characteristics. For example, some characteristics may be missing for some items. Characteristics can also be:

User specific (who uses it): such as user weight, height, beginner skier; and

Usage specific (how used): professional, leisure.

Attached to each characteristic is information describing that characteristic of that item 1300. Such information can be any length and any format, e.g. text, audio, video, or a combination thereof. If there are many characteristics they can be differentiated by importance in hierarchies. For example, an item can be defined as a combination of other items, e.g. a vacation package can contain a flight, hotel, car rental, and theater tickets, each of which could be an item in themselves. In this case these sub-items are characteristics.

Each item can be:

Fixed in nature: That is, the characteristics for a specific item are clearly (i.e. one-to-one) related, such as a specific book (e.g. "Designing Systems for Internet Commerce"), which has one, or a group of, specific authors (e.g. "W Treese, L Stewart"), one publisher (e.g. "Addison, Wesley"), and is of one type (e.g. "soft cover"). The same is true for a specific mutual fund or a specific house;

Dynamically generated and/or created based on logic module rules contained in the logic module 2000 (see FIG. 1). A dynamically generated item is created by combining separate characteristics to create one complete item that comprises the desired characteristics. For example, a vacation package can be created by combining flights that fulfill the departure and arrival characteristic with a hotel that satisfies the accommodation characteristic. These logic module rules contain limitations on what can and can not be combined.

Another example is in the area of financial services, such as assembling an asset allocation portfolio. These portfolios are assembled from a number of different financial instruments, such as mutual funds, cash, stocks, and bonds. The rules can determine, for example, which combination, results in what historic risk profile, and returns which satisfy the desired set of characteristics.

The logic module rules describe how to arrive at a characteristic, such as to calculate the total price of the item, while the total price is a characteristic. In addition to/or instead of price, the system can show such characteristics as calculated monthly leasing rates and down payment.

A combination of above, in which some characteristics are fixed and other characteristics can be added dynamically, such as the total price. For example, a number of different hotels can by used for a vacation package, while other characteristics are fixed, such as the flights and car rental; or for a book, the total price can vary based on source (e.g. Amazon.com or Barnes and Noble) of book and shipping cost.

The item searched for can reside on different data bases, and/or Web sites. For example, in one embodiment of the invention a new technology that describes data such as XML (Extensible Markup Language) is used to find an item across multiple Web sites. Characteristics, i.e. sub-items, as described above can also reside on multiple data bases and/or Web sites. The logic module 2000 comprises the rules, for example, of where to search and which database and/or Web sites to query.

An item can be tagged on-the-fly. In case of a knowledge data base, the system reviews tables of content and summaries along certain characteristics and/or key words, and tags the information for the search during the search (i.e. the information is not pre-tagged).

Presentation Module

Figure 3:
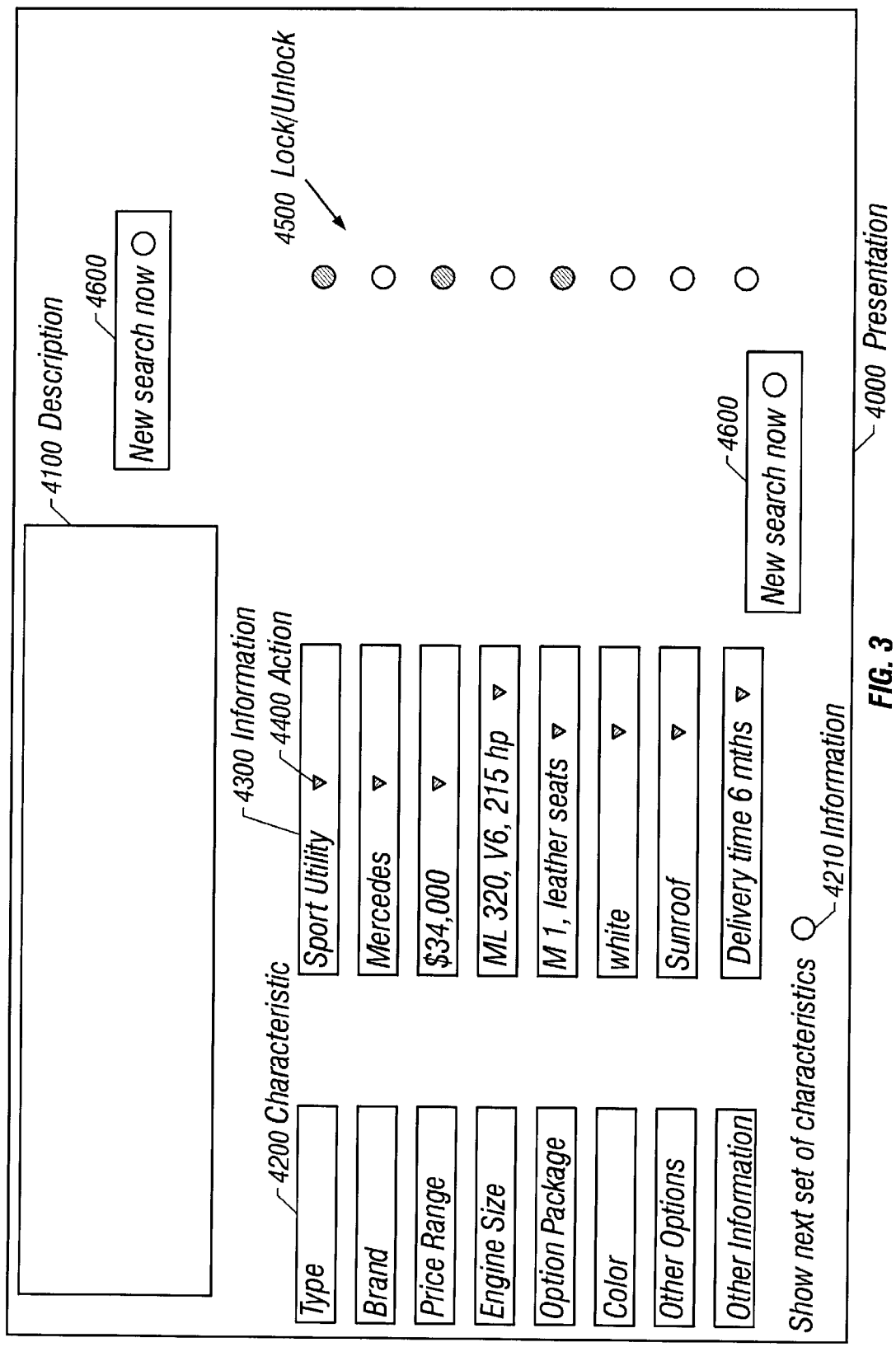
FIG. 3 is a block schematic diagram of a presentation module for an automobile search according to the invention.
Figure 4:
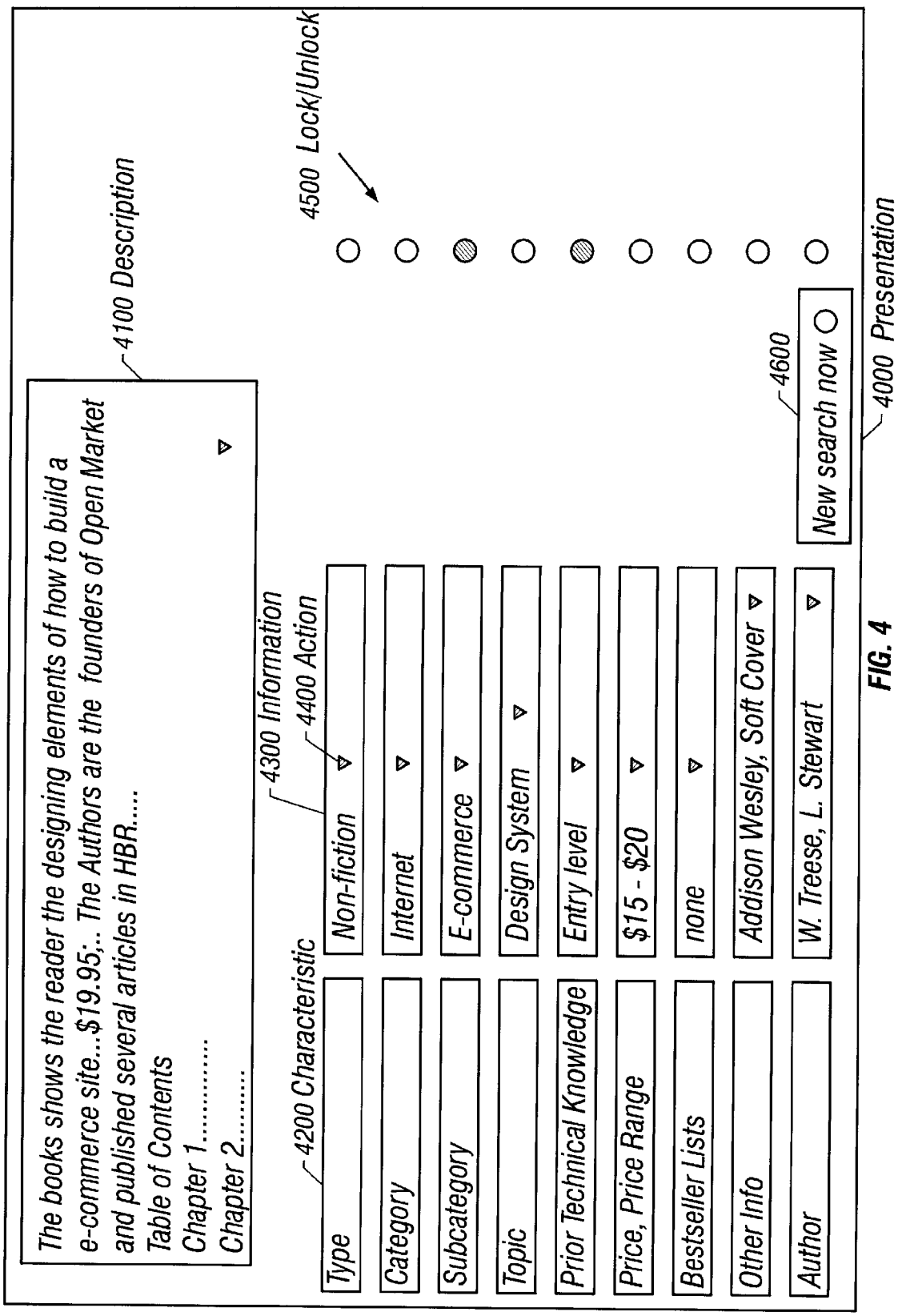
FIG. 4 is a block schematic diagram of a presentation module for a book search according to the invention.
Figure 9:
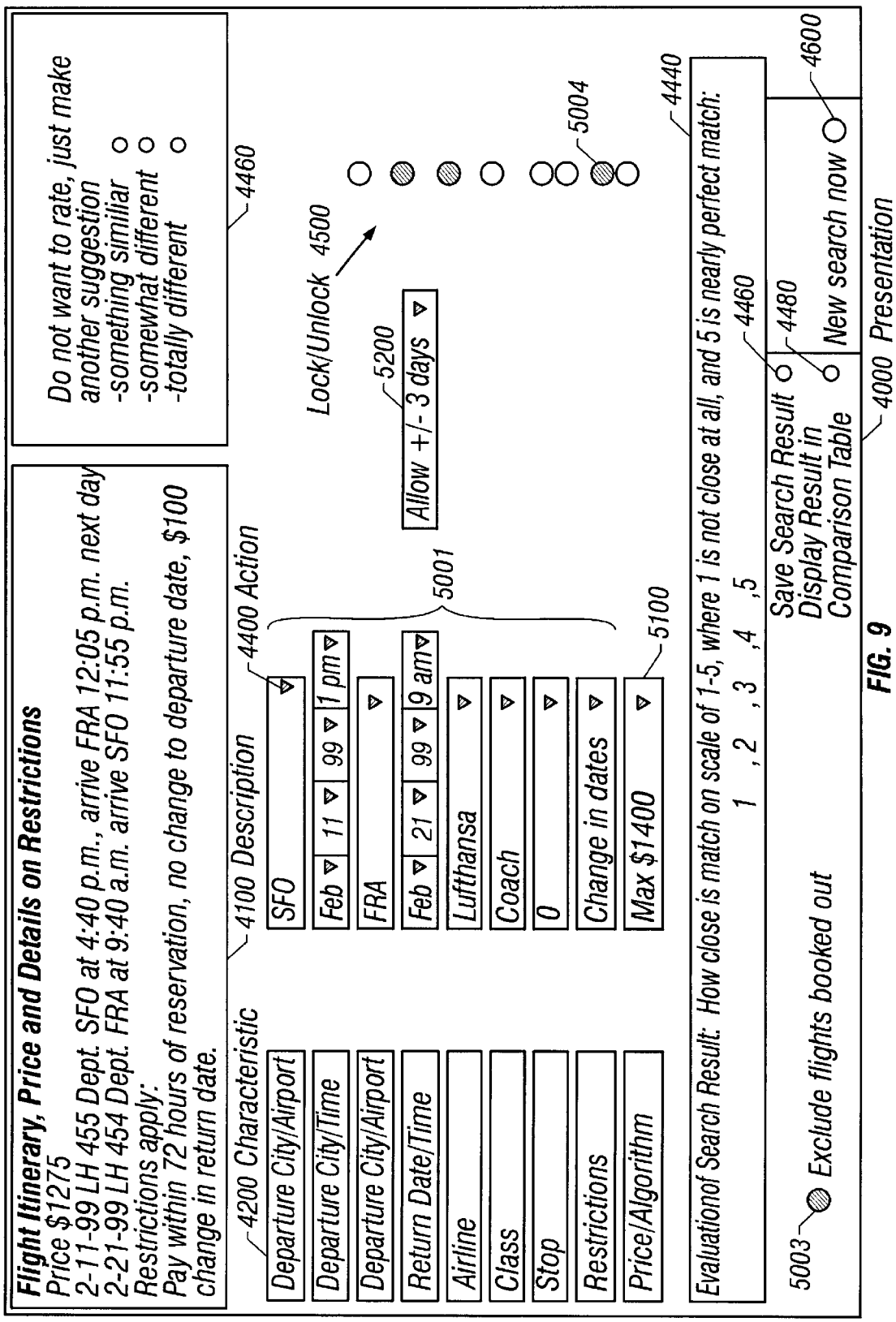
FIG. 9 is a schematic diagram that shows a feature of the invention in which the user can select and/or fine tune the search algorithm.

FIG. 3 is a block schematic diagram of a presentation module for an automobile search according to the invention; and FIG. 4 is a block schematic diagram of a presentation module for a book search according to the invention (see, also, FIG. 9). The presentation module typically comprises a description of a result 4100, a characteristic 4200, information 4300, an action 4400, and a locking feature 4500.

The presentation module can be implemented in any output device having a display. Depending on such factors as the device size and readability, the output can be structured differently. Typical output devices include personal computers, PDAs, televisions, pagers, and Internet devices. In some embodiments of the invention, it is not necessary to provide a visual display. For example, user interaction may proceed with a text to voice system, in which results are read it to the user over the telephone. The user uses the phone pad (DTMF tones) or his/her voice new commands/response to search characteristic.

The description 4100 shows the search result. This is a holistic result. The description can be text based, a picture, video, sound, or a combination thereof. The description can be short or long and have scroll down features. It can be interactive, hyper linked to detailed descriptions, or include special effects. For example, if a car is shown one may be able to rotate the car, view the interior, or get a detailed description of technical aspects. Similarly, for a book the table of contents, the book's listing on a best seller list, or reader comments may be shown.

The characteristics 4200 and information 4300 describe the item shown along with those characteristics. Additional characteristics are shown by scrolling down or selecting a button 4210. Any field of 4200, 4300 may be sensitive, such that the user gets definitions and/or more information by clicking on the field.

The action 4400 is the method by which the search parameters for the next search can be changed by the user. The action may be executed by a variety of methods, such as a pull down menu 4400 (see FIGS. 3 and 4), yes and no questions 4410 (see FIG. 5), multiple choice questions 4420 (see FIG. 5), and/or ratings 4430 (see FIG. 5). It is important to note that yes/no and/or ratings are especially useful for devices that do not have a keyboard, such as limited function input devices or limited voice recognition. Examples of such devices include television remote controls, PDAs, pagers, and telephones with and without screens. In contrast thereto, most modern search engines require the input of words via a keyboard.

Figure 5:
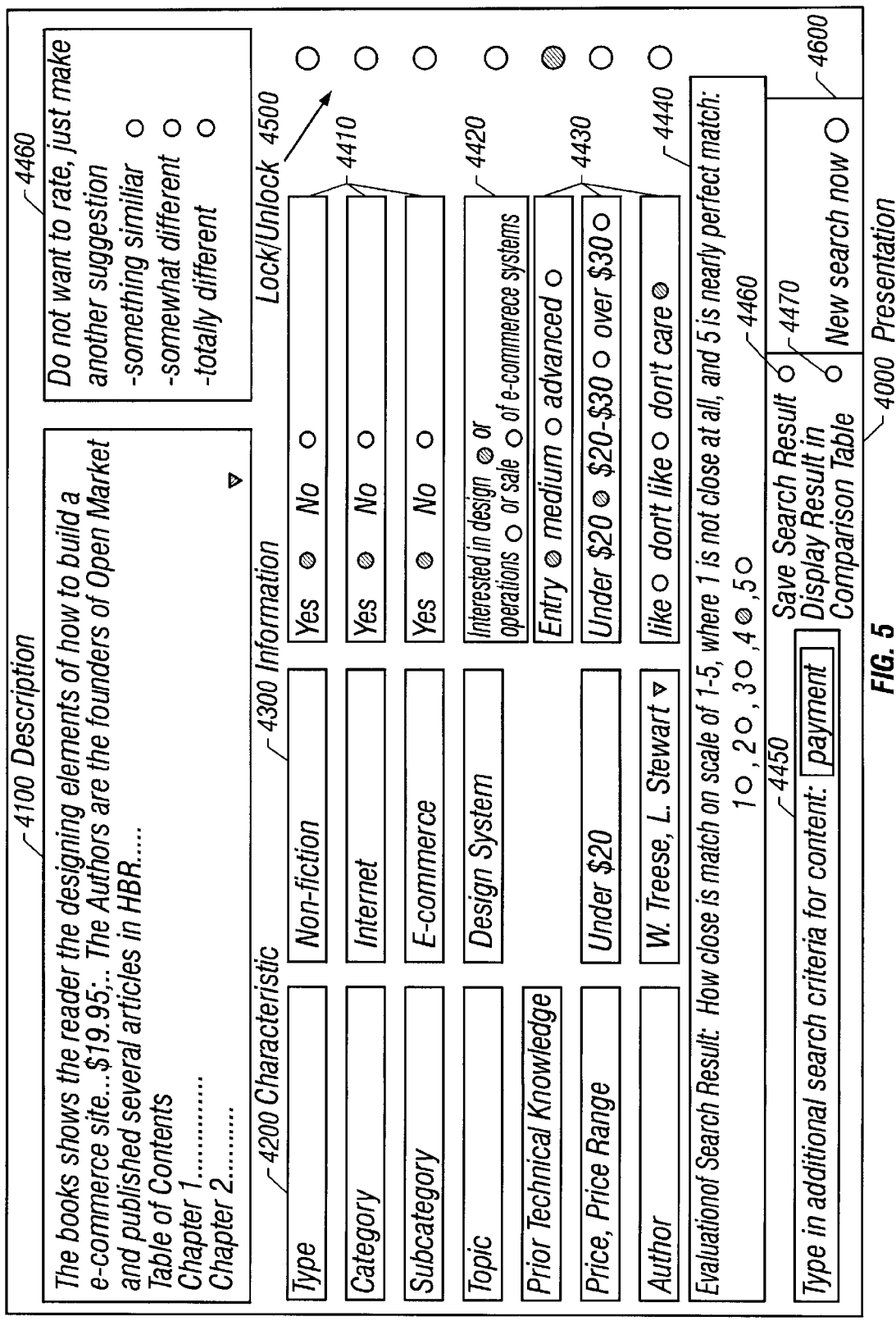
FIG. 5 is a block schematic diagram of a presentation module for a book in which the methods are intermixed according to the invention.

FIG. 5 is a block schematic diagram of a presentation module for a book search in which the methods are intermixed according to the invention.

A locking function 4500 allows the user to lock in characteristics which are desired. The user can also unlock characteristics.

A new search button 4600 allows a user to select a next iteration to find a better fitting solution. The new search function can be an enter function that may be voice activated or may be otherwise actuated.

The display can include an alternative way of asking for a new additional search or iteration. For example, a feature which allows the user to move on to a different result 4460 provides a "surfing" or scrolling function. In some embodiments of the invention, this function is provided by a next button that moves the user to a next item, such as a different car, the next scheduled flight or down the New York Times best seller list for books.

The invention also provides a function which allows the user to rate the search 4440 and which provides the logic module 2000 (see FIG. 1) to do so via input/feedback. The different result function 4460 and rating function 4440 are different methods that allow the user to move away from the next best fitting iteration to a totally new starting point in the search. This can be especially helpful if there is no user profile and the user has misjudged in selecting the most appropriate starting point. In a sense, this feature of the invention may be thought of as an escape option for a user where a search strategy is not yielding useful or appropriate results.

Another form of feedback for the logic module 2000 is the addition of search characteristics for content 4450 (see FIG. 5). This is particularly helpful when the system is looking for content, such as an article or a book. For example, knowing that the user is looking for a book related to e-commerce, and getting the characteristic "payment" allows the system to search for books which cover the topics of e-commerce, design (locked in this example), and payment systems and transactions for e-commerce systems. In some embodiments of the invention, a pull down menu is provided that shows the characteristics which are available and that allows the user to add more characteristics.

The interface of the search engine can be structured such that an alphanumeric keyboard is not needed for the data input. Therefore, a simple, standard remote control can be used to lock and change characteristics. This makes the search engine particularly valuable for use with television set-top boxes and other Internet devices that have limited data input options. The user controls can therefore be readily based on simple voice commands, e.g. up, down, left, right, select. For example, the invention can be implemented in a user device that comprises a touch screen, such as is found in multimedia kiosks or used with PDAs, such as the 3Com Palm Pilot.

FIG. 5 also shows a save search result button 4460. This feature saves the search and allows the user to begin an alternative search. The function "display results in comparison table" 4470 allows the user to display side by side saved results.

FIG. 5 also shows a feature of the invention in which the display has a link to another related transaction 4480, i.e. the buy now link. Such additional links allow a user, for example, to purchase a product, add a product to an electronic shopping cart, receive more information, or to print the found item.

The output display may take such forms as symbols for children or for international use, audio output and voice recognition, pictures such as for determining the proper fit of pants (e.g. relaxed fit, pleated, or type of pockets), or type of pant (e.g. jeans, khakis, or corduroys), and colors.

Logic Module

The search engine logic module 2000 (see FIG. 1) allows for intelligent multi-dimensional searches. The logic module always presents a complete, holistic result that provides the user with knowledge (linked facts) not just information (facts). The system is adaptive, such that the search results improve over time as the system learns about the user and develops a user profile. The system is self personalizing, i.e. it collects and analyzes history about the user, it has the user react to solutions and learns from those reactions. The system is also profiling, i.e. it learns from all searches of all users and combines the user profile and patterns of similar users. The system also accepts direct user feedback to improve next search iteration. Such feedback is multidimensional direct feedback, i.e. it has many characteristics.

As discussed above, the search engine provides a locking/unlocking function; actions that specify details about characteristics; qualitative ratings of overall results. The search engine also allows the user to introduce additional characteristics. Finally, the search engine may be set up such that no keyboard and/or mouse interface is required to operate the search engine or that it can be operated using a standard phone, using voice recognition and/or the phone pad as input device. For example using remote control, with up/down, and left/right, movements, as well as enter function (see FIG. 5, those elements identified by numeric designators 4410, 4420, 4430, 4440, are examples of how to design an input interface for a remote control or touch screen). One skilled in interface design can easily design alternative ways to implement the invention.

The search engine functions as follows:

The search engine picks one result as a starting point. For each result the most important characteristics 4200 are listed. The starting point can be context based. For example, if the search engine is integrated into an automobile Web site, the starting point is a car. If the search engine is integrated into a book Web site, the starting point a book, for example, on the New York Times best seller list or, potentially, all the books on the New York Times best seller list, thereby allowing the user to pick a book from the list. If the search engine is integrated into a Web site that is a portal or general merchandise site, the search engine shows pictures of the merchandise categories, or asks the user to input a key word or context sensitive sentence, such as "looking for a book on designing payment systems for e-commerce solutions."

The algorithm for selecting an initial result for an item identified above, such as a car, and/or the item's non-specified characteristics can be very simple or complex depending upon the application to which the invention is put. For example, a response may be selected at random, or preset default characteristics or results may be provided, e.g. a merchant may start with the most profitable product (i.e. a desired result). Alternatively, the initial result may be selected from historically most popular characteristics or such characteristics as those which fit to the profile of the user, those which are known to the system through available customer data, those which are previously provided directly or indirectly by user, or those which are deducted from earlier selection of characteristics, e.g. customers having a similar profile may have chosen before. All of these searches are stored in the user database 3000 (see FIG. 1)

After an initial result is selected, the user reviews the result. The user can lock 4500 the characteristics 4200 he likes and change a few or all of the others, such as the various actions 4400 (see FIG. 4), 4410 4420, 4430 (see FIG. 5). To get the next result, the user selects a button 4600 (see FIG. 5).

The next response of the system is a result that fits the search to the new set of characteristics. If the user has not specified core characteristics, the search engine uses an internal algorithm to fit in the missing information. Alternative algorithms are discussed below. If there is a large number of characteristics, the system fills in those characteristics that are not specified using pre-selected, default, or most appropriate values. These characteristics are often less important or lower priority characteristics.

If certain characteristics are locked, or if user chosen characteristics conflict with each other, a trade-off is needed. The search engine once again selects a result, but points the violation out to the user. The search engine attempts to fulfill the higher level, more important characteristics first, violating lower level characteristics if there is differentiation in importance of characteristics. In this case, the user can reject the result offered and the system then generates a new result violating a different characteristic without changing the locking. To get the next result, the user selects a button 4600 (see FIG. 5).

If a characteristic is locked, for example a 12 cylinder engine, and now the user changes the brand of the car, and in that brand a 12 cylinder engine is not available, the system substitutes the next best solution, indicating that previously locked solution does not exist. Until the locking is changed, the system remembers the request. If the user moves to the next brand, the system once again searches for the 12 cylinder engine.

Alternatively, the search engine generates results using a conjoint analysis algorithm. In this case, the solution generated is not a best fitting solution, but a solution selected to help assess the user's preferences and relative importance of the characteristics. The objective of the conjoint analysis algorithm is not to get to the best fitting results with the least number of iterations, but to learn the most about the user. This is achieved by providing intelligent choices and learning about the user from the manner in which he makes choices compared to others, or from a set of expectations stored in the database 3000.

This aspect of the invention is an important feature of this embodiment. The search engine does not just look at historic data and correlate such data to user profiles (although the system does this as well). Rather, the search engine goes one step further and forces the user to make choices. Thus, the search engine learns by looking at the user's answers and by (optionally) correlating those answers to other user profiles. For an example of techniques in the art that may be applied to this aspect of the invention, see T. Gerace, Method and Apparatus for Determining Behavioral Profile of a Computer User, U.S. Pat. No. 5,848,396 (Dec. 8, 1998). It will be appreciated by those skilled in the art that, instead of conjoint analysis, any other form of analysis may be used in the invention, if that such analysis is based on intelligently generating a result with the purpose of learning about the user's reaction. Based on the strength of the algorithm, the invention provides an adaptive, i.e. self learning and personalizing, knowledge search tool.

Bundling of Products/Services: If a person searched for a car, the system also facilitates the search for related products and services, such as financing and insurance. The system uses the information available about the user and the car selected to offer or suggest financing. The characteristics of the financing solution are total price of car selected (which is taken from search, adjusted by negotiated price vs. listed price), miles driven per year, years of loan, annual income, debt, and other financial information. The user uses the pull down menu/or other input options to adjust those variables to his actual situation. The same can be done for insurance. The system makes a number of assumptions regarding the starting values of the characteristics, such as miles/year, deductible, uninsured driver option, liability limits, driving records, and age of primary driver. The more the system knows and/or has already learnt about the user the better those assumptions are. The user can change these input variables to fit to his situation.

The search engine allows the user to bundle a number of products and/or services. After a user has searched for the primary product (e.g. a car) and the other, dependent products (e.g. insurance, loan), the system presents the user with a summary page, stating the car, and key terms of the other products. To allow an overall comparison of similar bundles, the system calculates a common number (if such a number is logically possible), such as total monthly costs or total cost per mile. To do this the system uses the information regarding annual mileage and the total miles driven (which it knows from insurance calculation). A bundle has the advantage that if the user changes one or any number of the characteristics of any of the items in the bundle, the changes are automatically reflected in all other dependent products. The user also receives an updated total common value, such as cost per mile and/or year. Other examples for bundles are financial portfolios, vacation packages, purchasing a home, relocating, and many other events comprising a set of different services and/or products.

Figure 8:
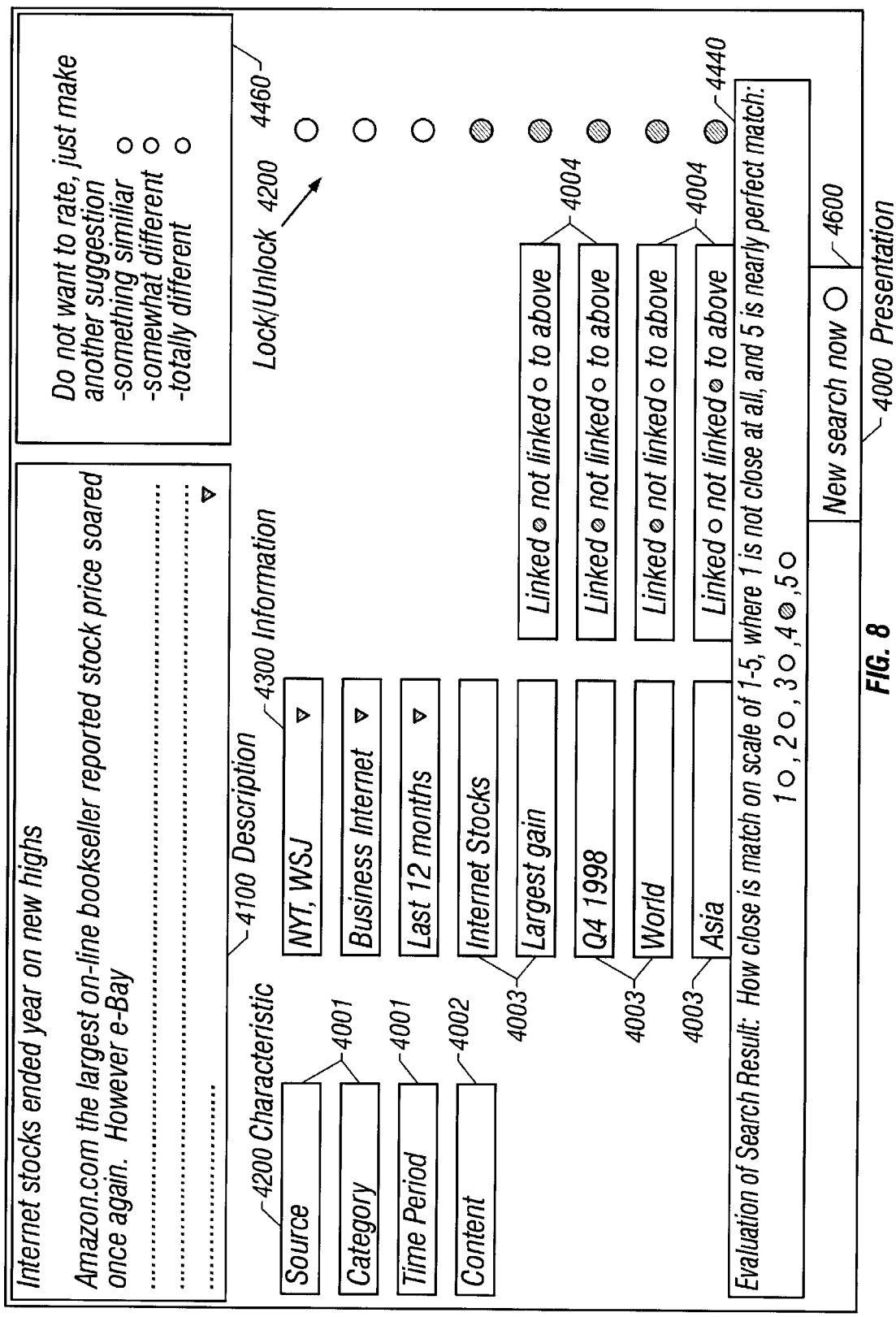
FIG. 8 is a schematic diagram that illustrates an application of the search engine that allows various characteristics to be detailed by the user and that allows the user to determine the logical relationship to each other according to the invention.

Determining logical relationships between characteristics and/or details describing a characteristic: FIG. 8 is an application of the search engine that illustrates two additional features of the invention:

that allow various characteristics to be detailed by the user 4003; and that allow the user to determine the logical relationship to each other 4004.

A characteristic 4002 can be described by one or several characteristic details 4003. The user can also determine 4004 what type of relationship exists between these characteristic details, for example are they linked, included, excluded, and/or other type of relationship between the details. Knowledge, as it is defined earlier, is a set of facts tied together by some logic module relationship, the above is one method of tying together these facts. In a similar fashion (not shown in FIG. 8) a set of characteristics can be linked together.

Figure 10:
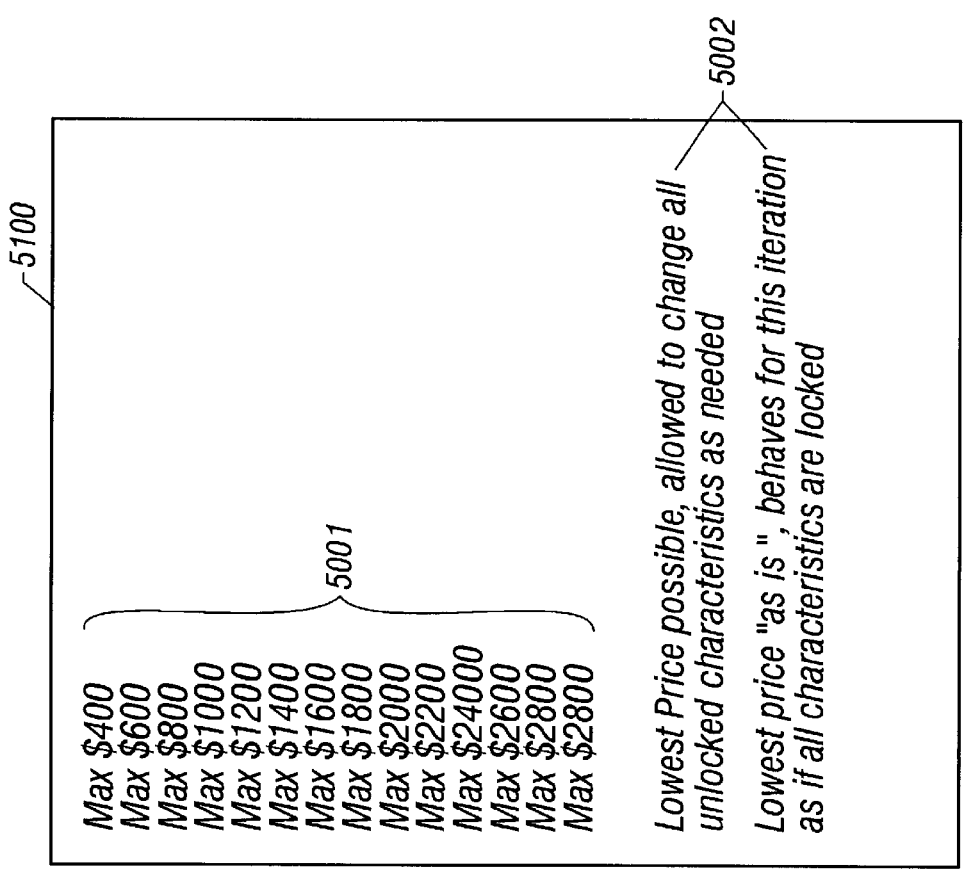
FIG. 10 is another schematic diagram that shows a feature of the invention in which the user can select and/or fine tune the search algorithm.

FIG. 9, and 10 show an other feature of the invention, in which the user can select and/or fine-tune the search algorithm. The user, for example, can select from a number of options (FIG. 10), and can further change this algorithm by excluding a certain set of data (FIG. 9, 5003.).

If there are a number of similar results, the search engine orders them according to a fit of characteristics and allows the user to scroll through them in sequential order, or presents them in a summarized version in a comparison table.

In an alternative embodiment of the invention, if the hierarchy differs significantly based on the objectives of the user, e.g. where the search engine is looking for a particular written article or Web site page, and it is not evident which topics are critical and which topics are not, the user might also be asked to provide some indication of importance of characteristics when presented with a solution. This indication can be a ranking. Therefore, the user is in essence determining the hierarchy levels. Alternatively, the user may be asked to provide such indication indirectly, e.g. by expressing a level of satisfaction with the solutions provided. Based on such indications, a hierarchy of the characteristics is deduced. Alternatively, the profile of the user is used to determine the hierarchy.

Database

The user database 3000 (see FIG. 1) contains all the historic data about users and searches. Such information includes information about a user, where such user information is collected during the user's searches. Such information may also include third party information acquired about the user, information about profiles of users or user groups against which the profile of a specific user can be measured, and information about what products a user having a similar profile likes. Alternatively, the database may comprise a plurality of databases that are distributed over a network and connected to each other.

FIG. 6 is a table that provides an example of a simple database. The characteristics are sorted in three classes of hierarchies An, Bn, Cn. The database can contain additional very detailed descriptions about each of these characteristics, not shown in the figure. Key to the database is the provision of a structure along the characteristics. It is also possible to tag data on the fly. This means the data is not structured as it sits in the database, but is structured later.

The system does not necessarily need a database as shown in FIG. 6. Based on new technologies, such as Extensible Markup Language (XML), an extension to HTML programming language that describes data (pictures, text, video), XML extends this capability by also indicating the function of data. XML allows a Web site to classify the content of its Web pages, thereby making it easier to find information. Web sites then become virtual data bases of information that can be searched, categorized, accessed without need for replication or indexing.

EXAMPLE

Figure 7A:
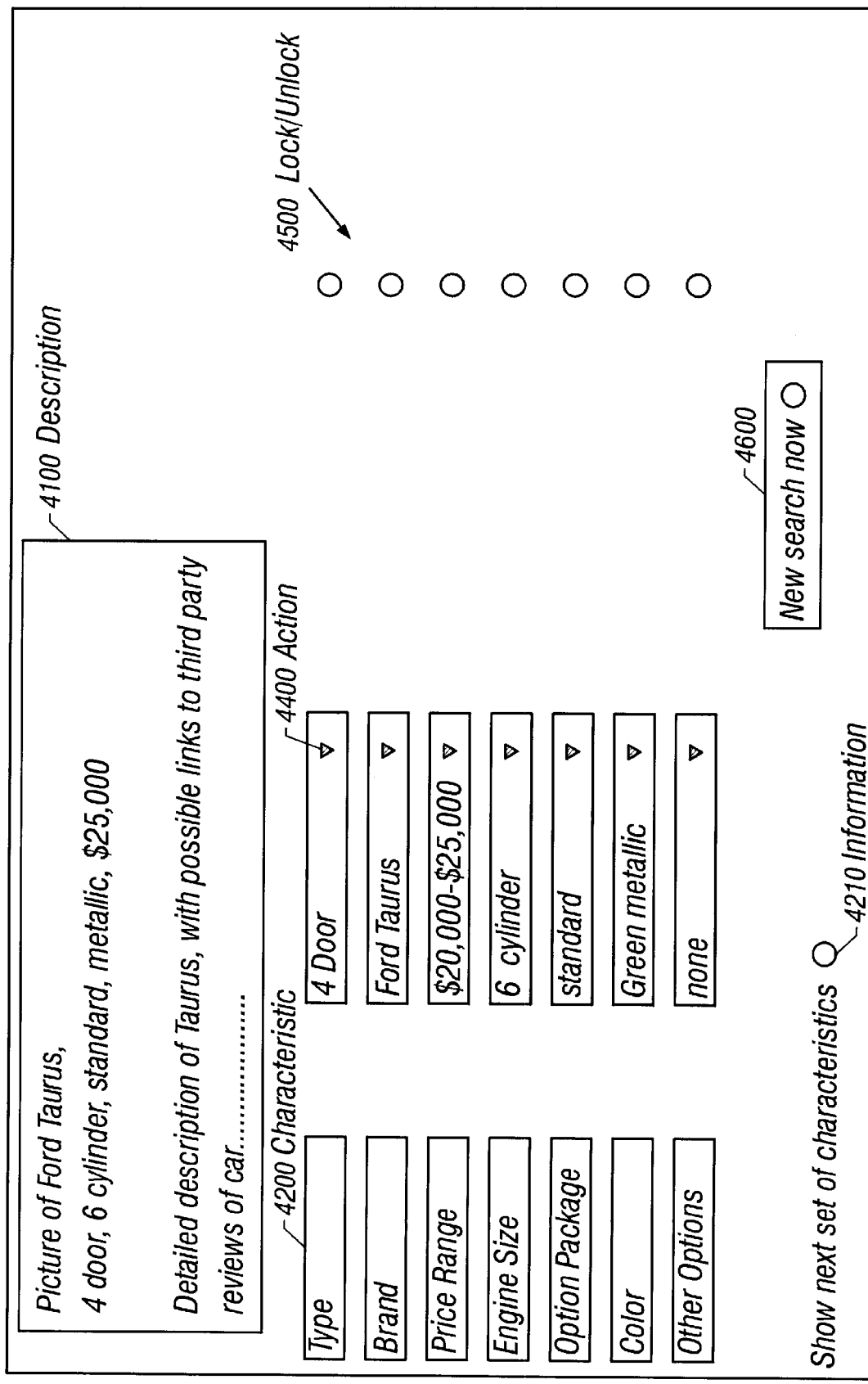
FIGS. 7A–7N are a series of block schematic diagrams that provide an example of a user search performed in accordance with the invention.
Figure 7B:
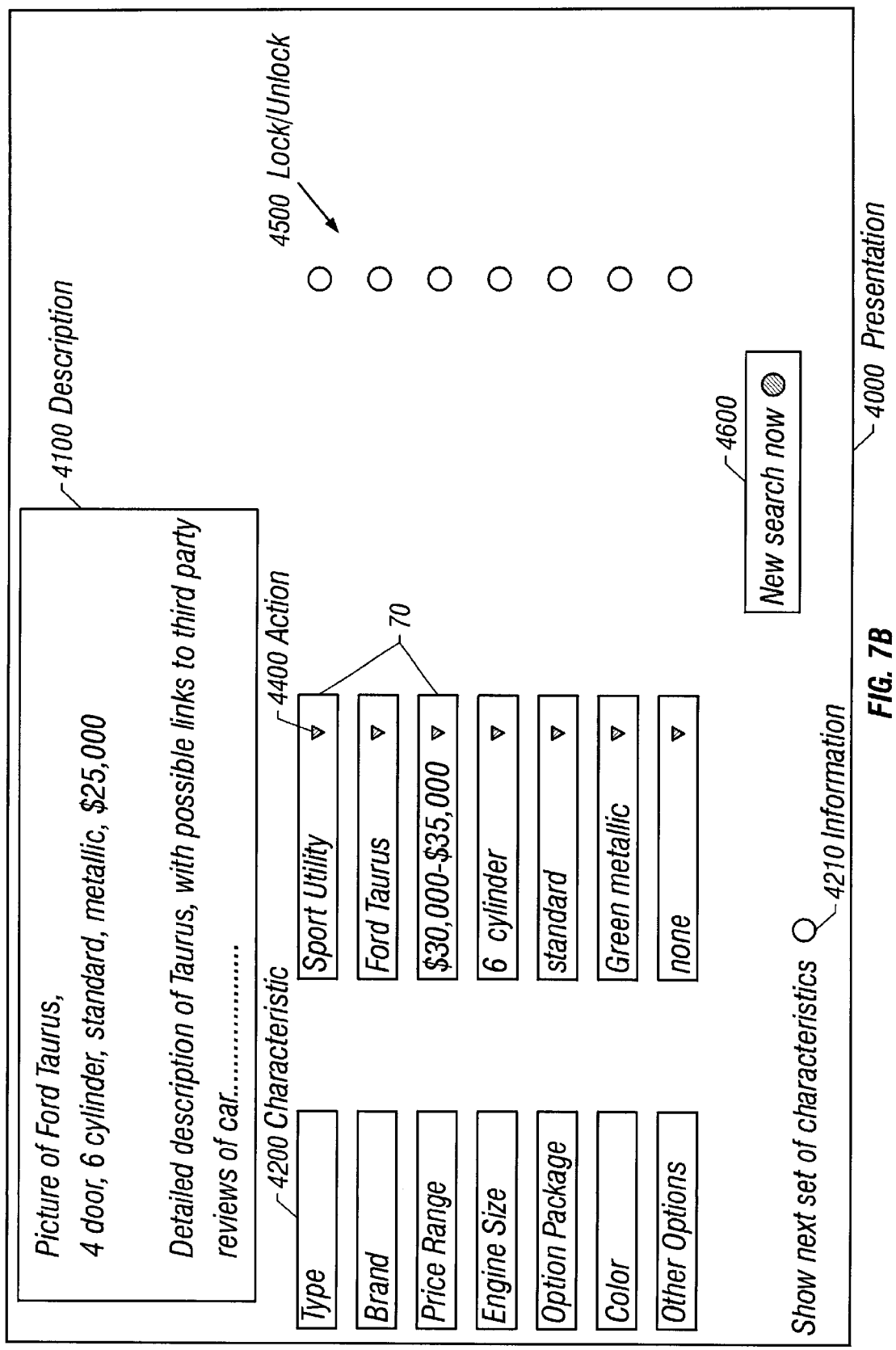
Figure 7C:
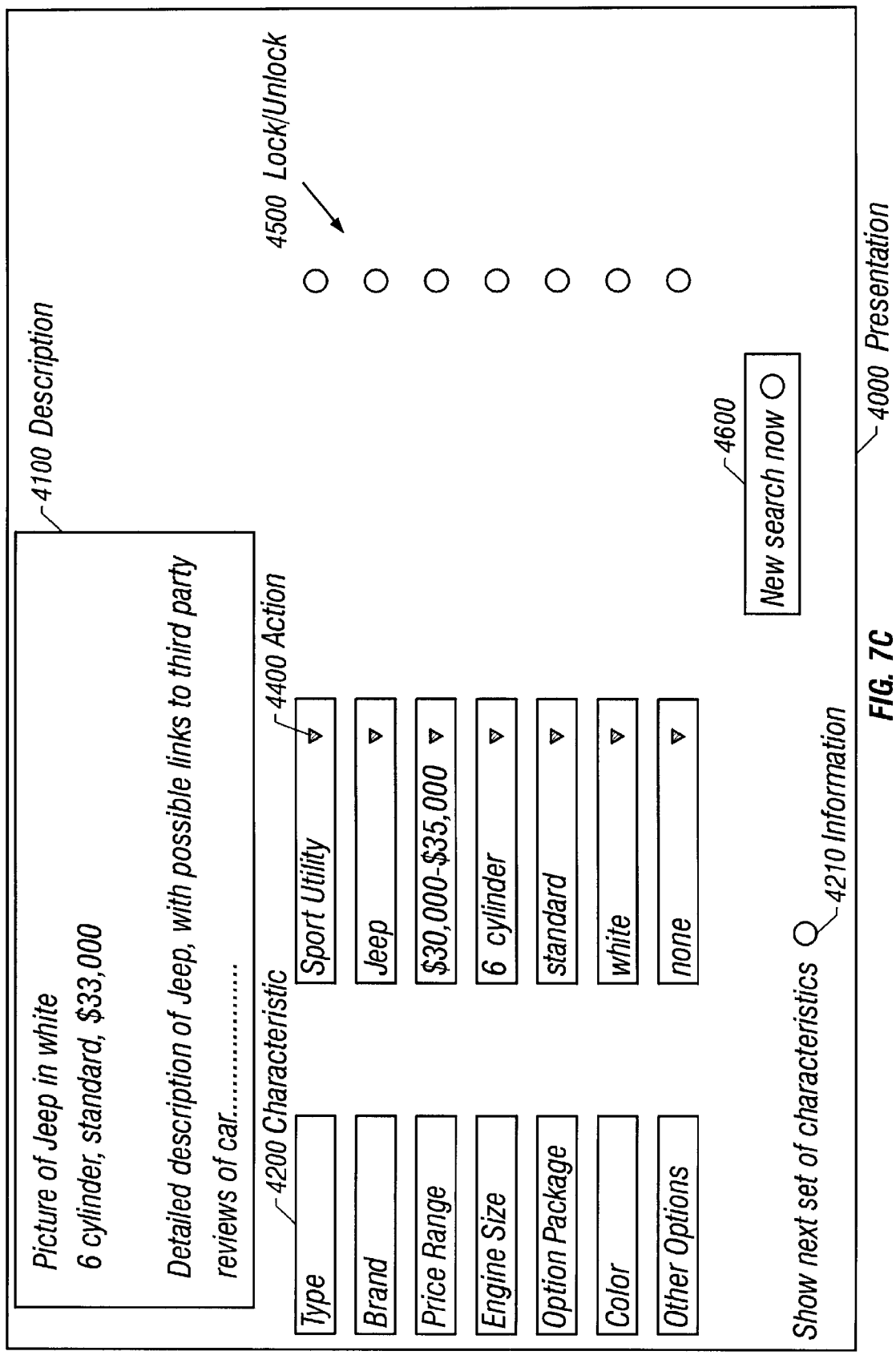
Figure 7D:
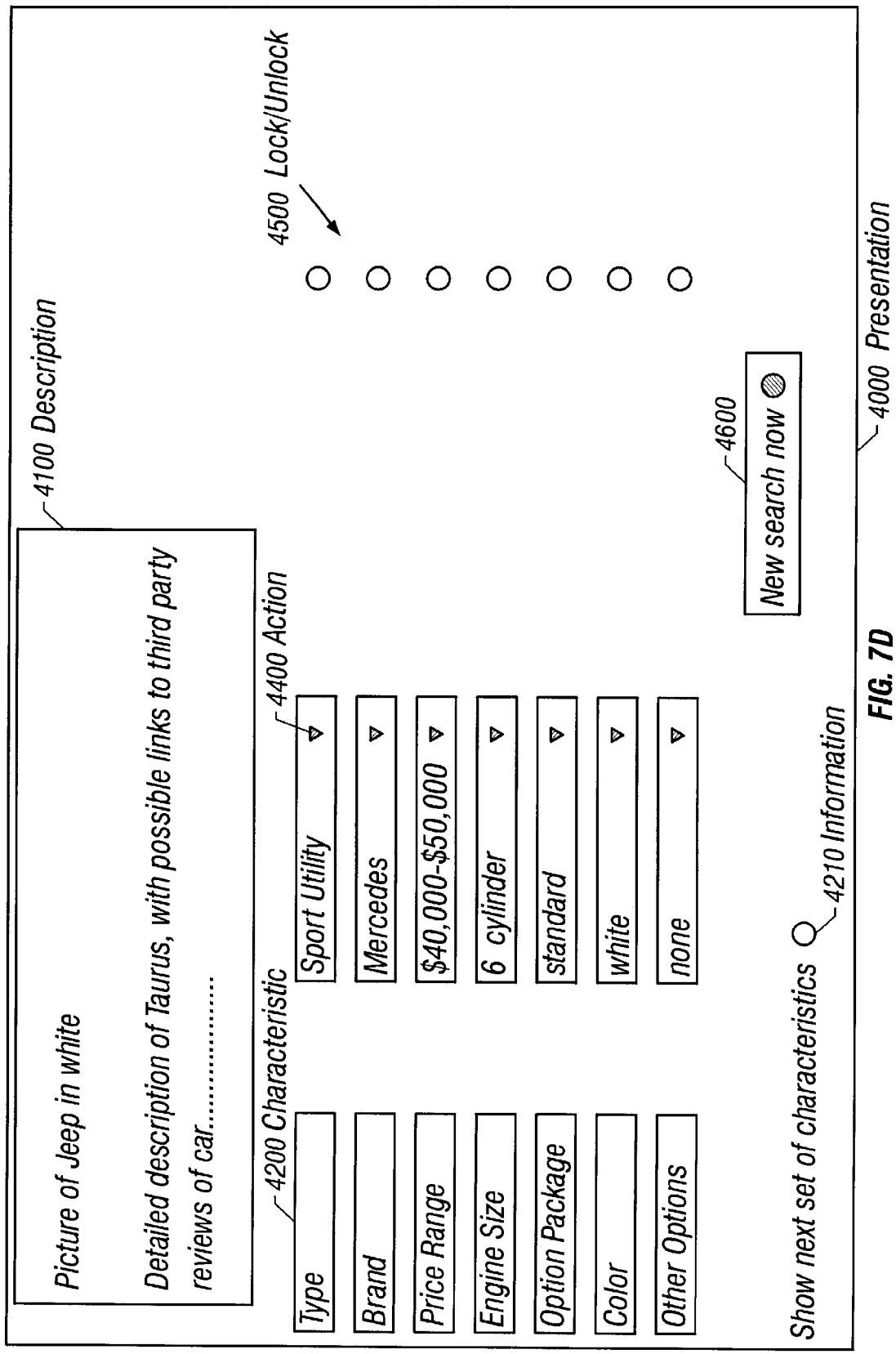
Figure 7E:
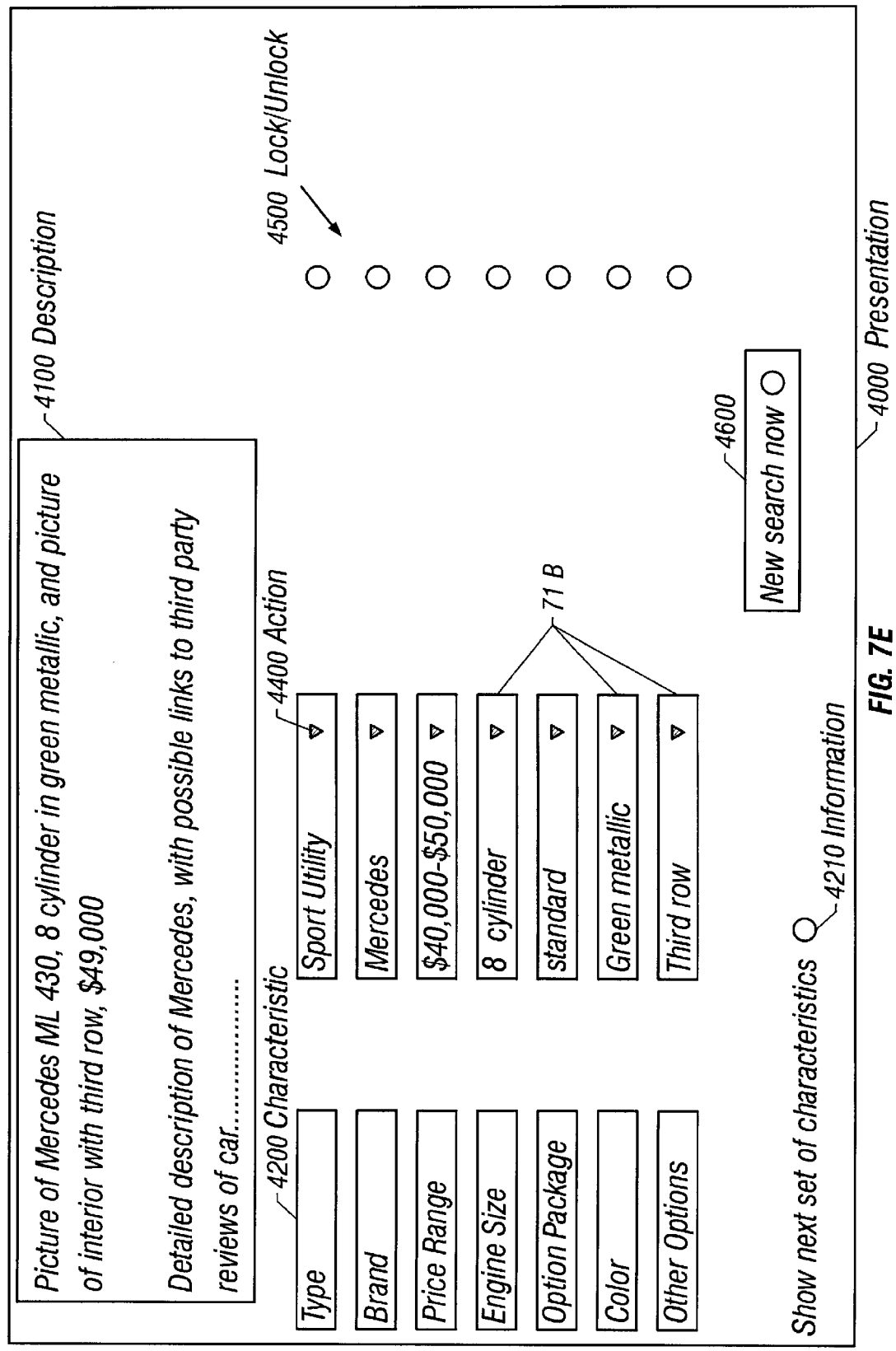
Figure 7F:
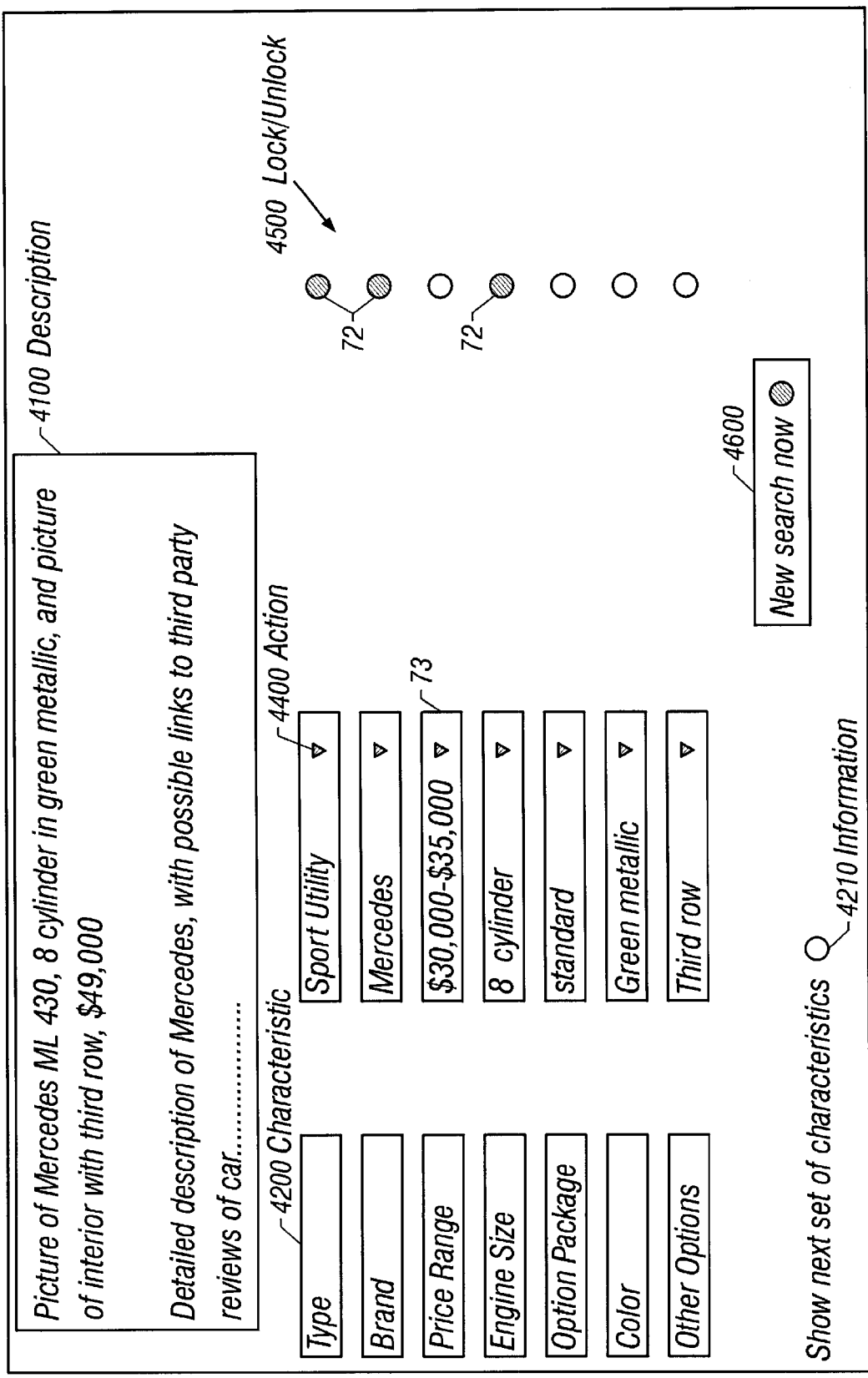
Figure 7G:
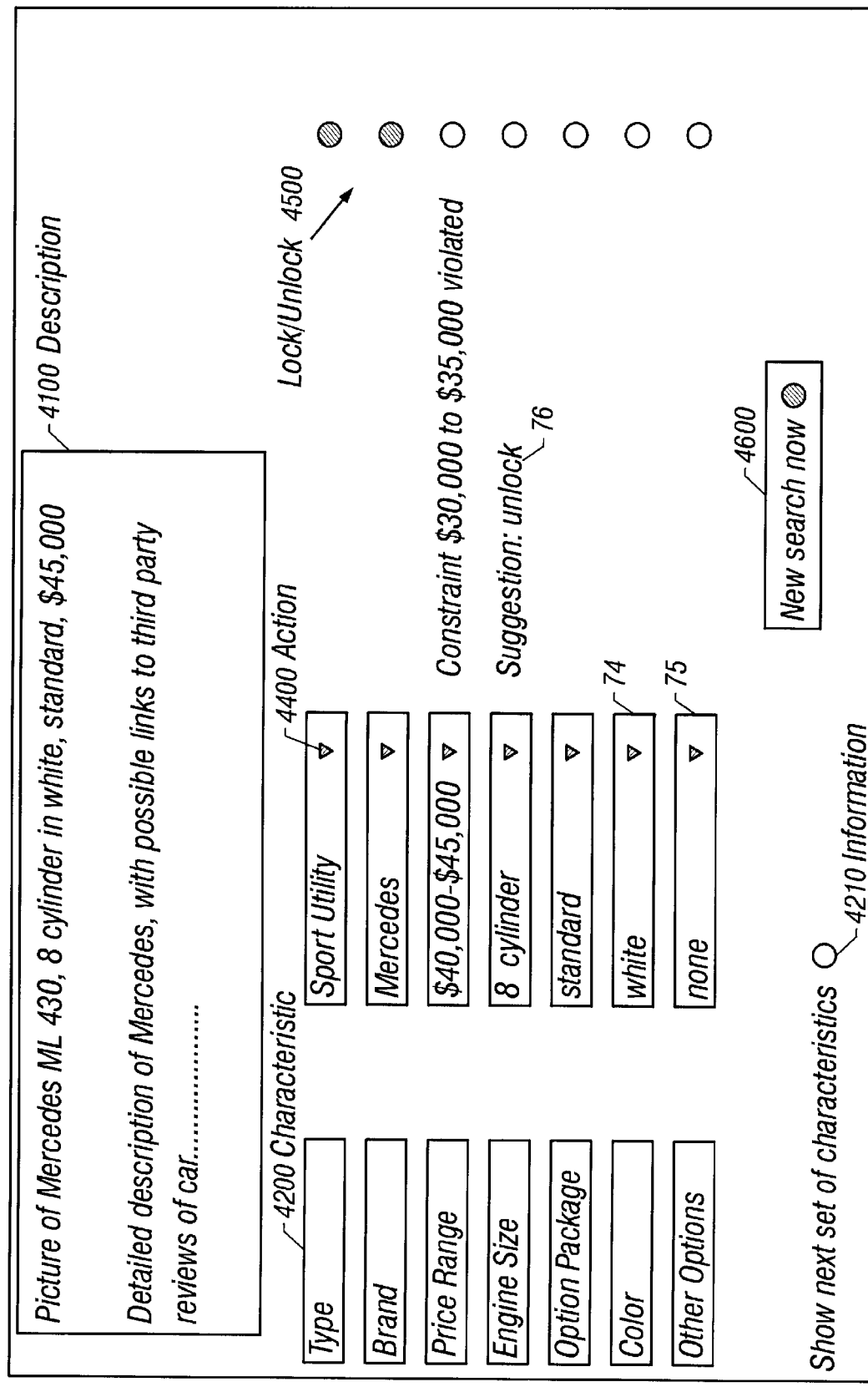
Figure 7H:
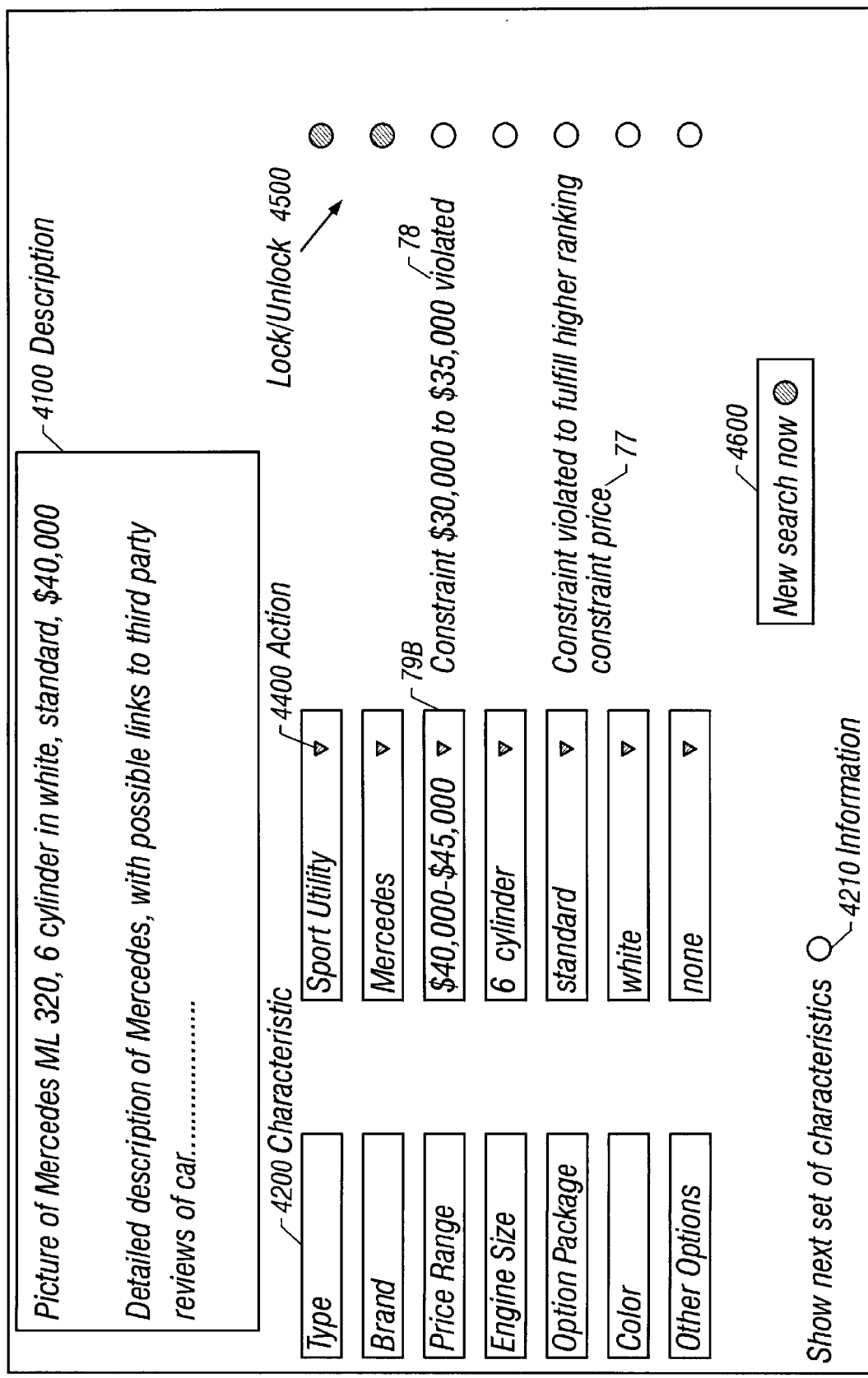
Figure 71:
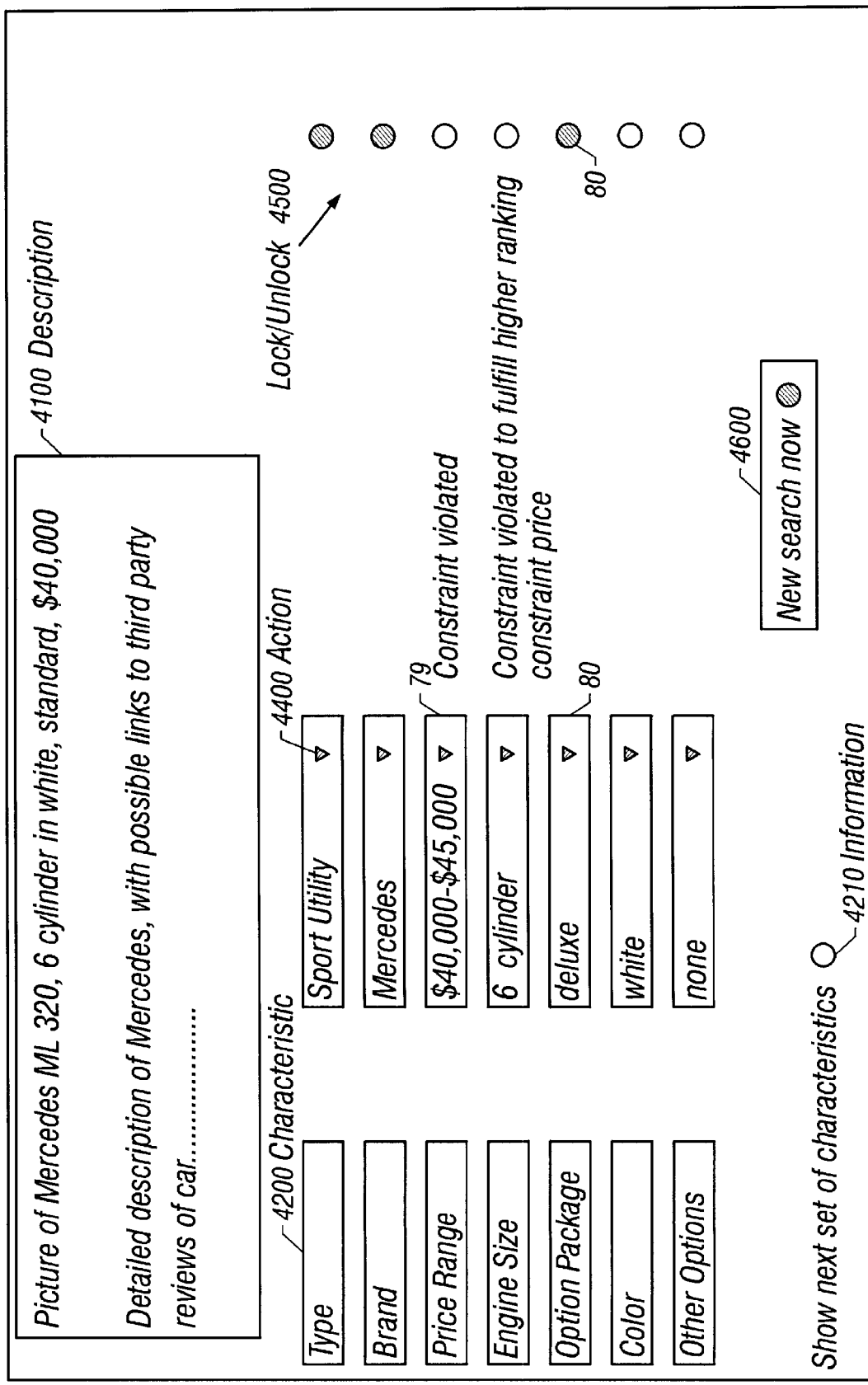
Figure 7J:
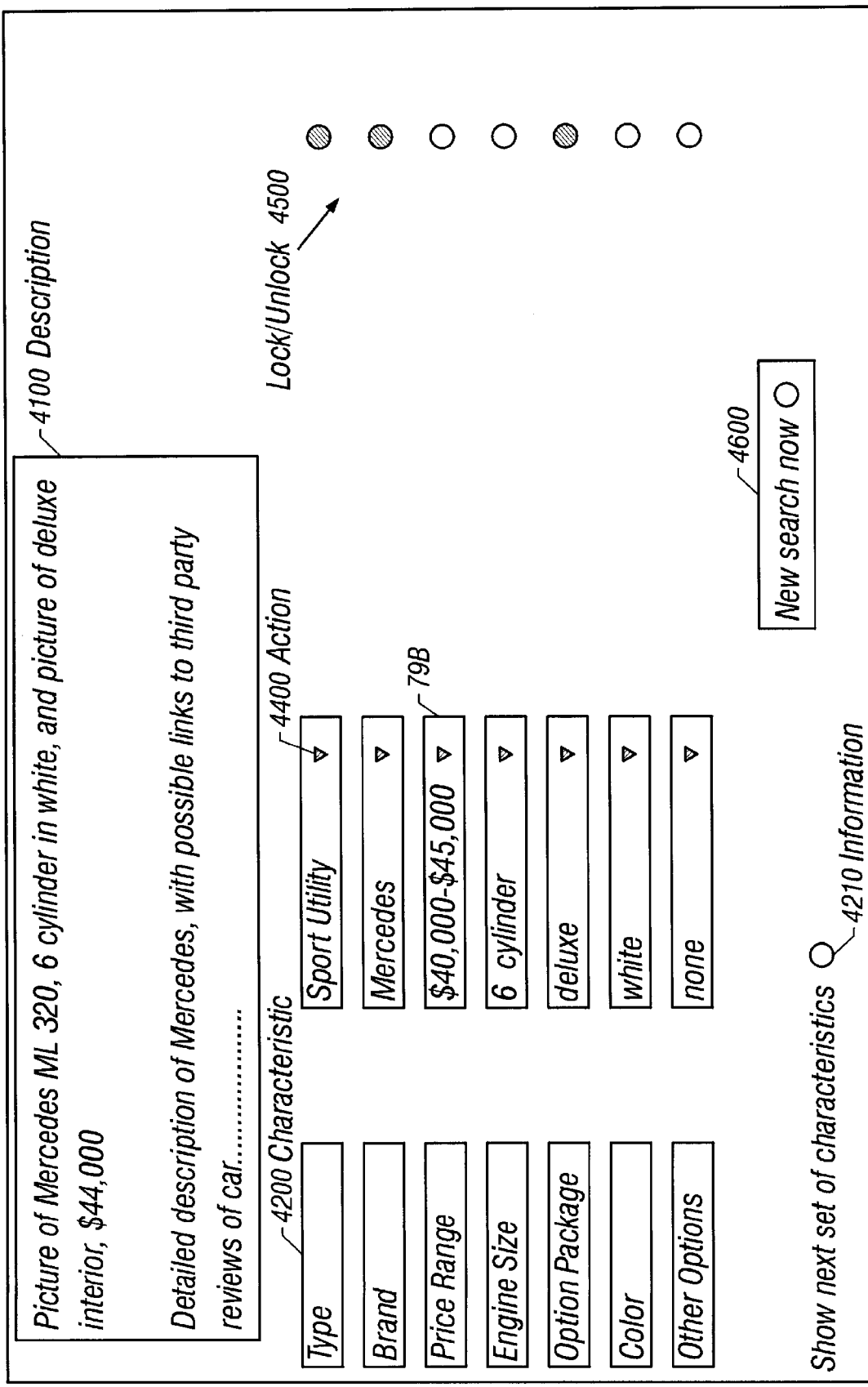
Figure 7K:
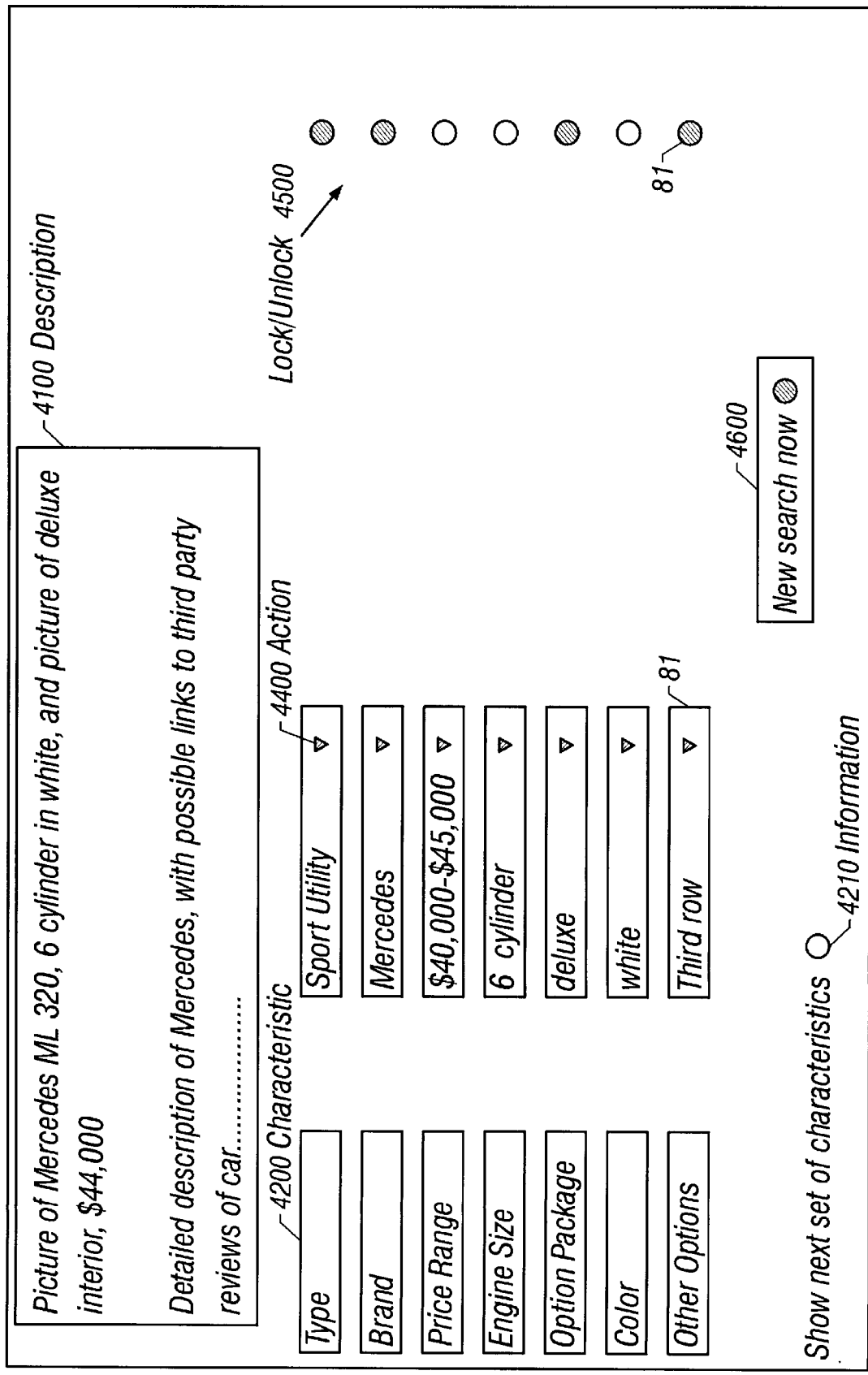
Figure 7L:
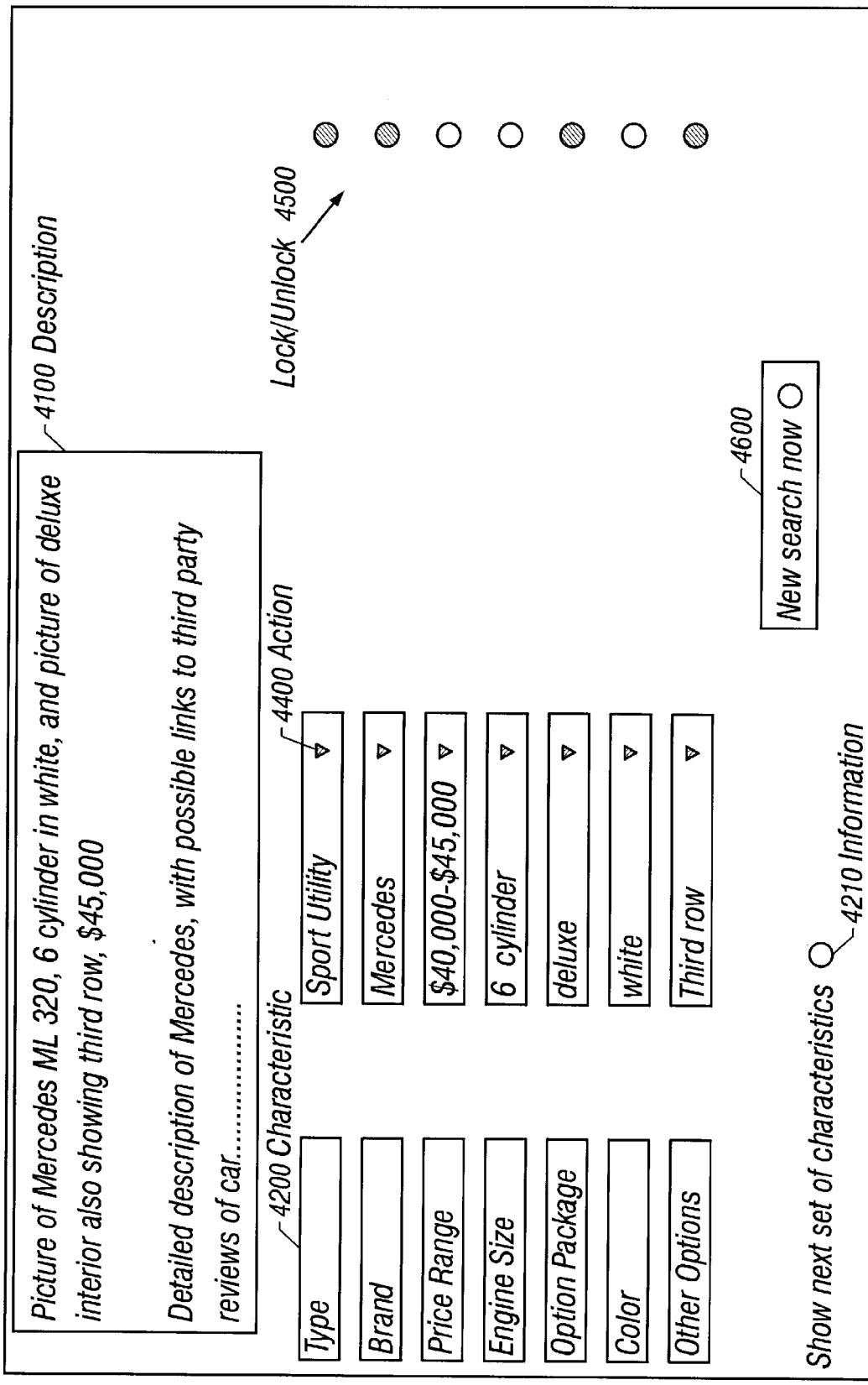
Figure 7N:
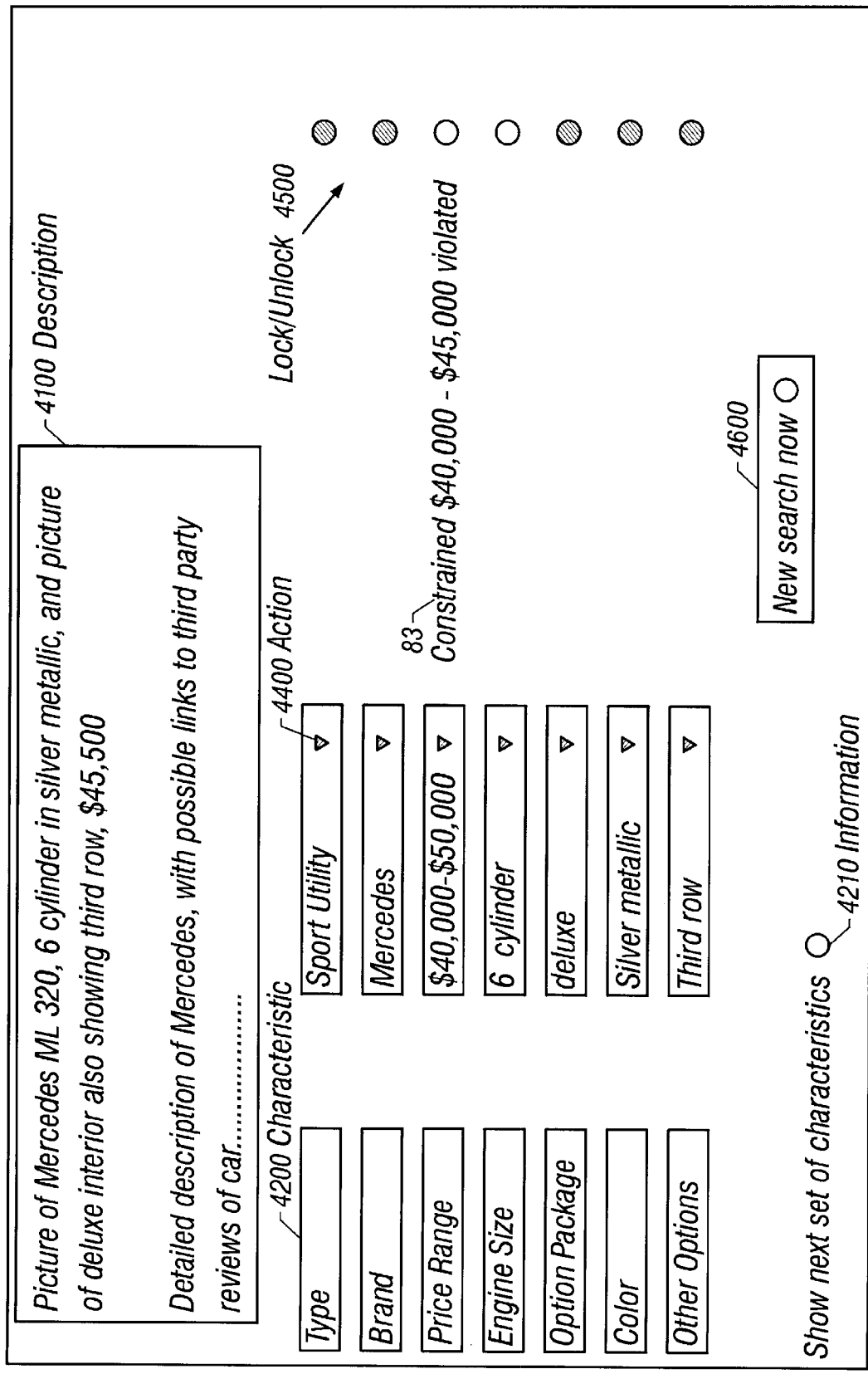

FIGS. 7A–7N are a series of block schematic diagrams that provide an example of a user search performed in accordance with the invention. The example proceeds with a search for an automobile. Those skilled in the art will appreciate that this example is provided only for purposes of illustrating the operation of the presently preferred embodiment of the invention and that the herein disclosed search engine is readily applicable to any type of search.

FIG. 7A is the starting selection in the example and shows a preset display of the currently most popular car model in its most popular configuration. The car, including its price, is described in detail in description 4100 FIG. 7A.

The user selects "sport utility" and increases the price range to $30–$35,000 70 (FIG. 7B) and selects the new search now button 4600. The result is that the search engine displays the most popular sports utility vehicle in the given price range (FIG. 7C).

The user now changes the model to a Mercedes and increases the price range to $40–$50,000 71 (FIG. 7D) by selecting the "new search now" button 4600, resulting in the display of a popular sports utility model from Mercedes (FIG. 7E), which satisfies the higher priority characteristics A1, A2, A3 as shown in database FIG. 6. The higher price range allowed to upgrade the lower level characteristics 8 cylinder, metallic paint, third row 71B FIG. 7E. Note the option package has not been upgraded. The system selected this choice of upgrade based on an algorithm/rules which try to select the most popular configuration of the vehicle, satisfying higher priority characteristics. However, this might have been any other algorithm or rules.

The user locks in the type, brand, and engine size 72 (FIG. 7F), and selects a lower target price 73 by selecting the "new search now" button 4600.

This selection results in a violation of constraints (FIG. 7G). The system reduces the price by changing the color to a non-metallic color 74 and by deleting the optional third row 75. However, this is not enough to reduce the price to the target rate selected in 73 FIG. 7F. The system violates this constraint, highlighting the violation. In addition, the system suggests that the user unlock the engine constraint 76, which the user subsequently does. The user also selects the option deluxe (not shown) and resets the price range to $30–$35,000 (not shown). The user then selects the "new search now" button 4600.

FIG. 7H shows the new result. In an attempt to satisfy the characteristic price, the system violated the lower level constraint asking for a deluxe version 77 (FIG. 7H). In essence, the system ignored this request. However, the price constraint is still violated 78 (FIG. 7H). Note the system could not move to a smaller, 4 cylinder engine because such a model is not available for the type and brand which have been locked. Also, note the system shows the price range within which this solution falls, 79 B. Again, the user is informed about this violation.

The user now makes no change to the price range, 79 (FIG. 7I), adds the deluxe request and locks this request 80, and selects the "new search now" button 4600. The system finds a matching car (FIG. 7J).

The user adds one option, the third row and locks it 81 (FIG. 7K) and selects the "new search now" button 4600. The result is displayed to the user (FIG. 7L)

In a last step, the color is changed from white to silver metallic and locks it 82 (FIG. 7M), and selects the "new search now" button 4600, resulting in final selection (FIG. 7N), where the price constraint is violated by $500 83 FIG. 7N The system can make no suggestions how to reduce the price because most characteristics are locked and there is no smaller engine, as discussed above.

The process could continue now, or further characteristics could be introduced at an earlier stage, if there are any. In the example of the car, these characteristics may include a type of stereo, delivery times as they currently exist for Mercedes M class, service/maintenance contract options, and/or leasing. To get that information, the user selects the information button 4210 (see FIGS. 7A–7N). An advanced system might ask for a leasing option as a main characteristic and then, instead of, or in addition to, quoting the price, the system quotes the monthly leasing payment and down payment.

It is important to note that at every step the user had a totally configured solution car. The user first changed the higher hierarchy characteristics, then the lower hierarchy characteristics in an interactive manner, ending with the least important characteristic for the user in the example, i.e. color.

In addition, the system learned a considerable amount of information about the customer. The user is looking only for a sport utility vehicle. The brand is also very important to the user because the user is willing to accept a major deviation from his target price. Finally, less conclusive is the observation that the user wants to choose the additional third row option. From this, one might assume that the user has a family. Should the user, for example, return to the site to search for a used car, the system could start with offering a Mercedes sports utility vehicle, if such a model is in the inventory stock, all based on the above observations made by the system during the user's previous search session. Assuming that a Mercedes is not available, the system might offer a Durango sports vehicle, which is equipped with a third row. Or, based on the other user preference for deluxe options, the system learned that a good alternative to the Mercedes is the Lincoln Navigator with a third row.

This very simple example makes it evident how powerful the invention is, when compared to any of the methods currently available.

An application for the purchase of books is very similar. Level A characteristics are category fiction/non-fiction, e.g. best seller, new publication, or old. Level B characteristics can be author and/or subject. Level C characteristics can provide further detail or refinements of subject matter. Assuming that a user of the system has searched for books and cars, a user profile can be developed and applied across other product categories. Thus, the system learned on its own how to best serve information to the user.

FIG. 8 illustrates a content application of the search engine that allows various characteristics to be detailed by the user 4003 and logically linked to each other by the user 4004. This allows the search characteristics to be tailored to retrieve only those items that fit the user's search strategy.

For example when looking for an article (content), or Web site/page some of the characteristics 4001 FIG. 8 can be well structured, such as category (business Internet, marketing, legal), source (NYT or WSJ), date or time period, etc. Other characteristics relating to content are less well structured 4002 FIG. 8.

The user can determine one or several characteristic details, details describing a characteristic, in this example called content, by typing (those skilled in the art will appreciate that there are other methods, like such as predetermined and pull down menu) those details in one or more fields 4003 FIG. 8). The user can also determine 4004 what type of relationship exists between these characteristic details, for example are they linked, included, excluded, and other type of relationships. In the example shown, Internet Stocks linked to Largest Gain linked to Q4 1998 linked to world, but Asia is excluded. Again someone skilled in the art can use other methods/logic of linking the details of characteristics. The search in this example is therefore for information (e.g. articles, w or Web sites) which talk about the Internet stocks which gained the most in value over the last quarter of 1998 worldwide with the exception of Asia.

In a similar fashion characteristics themselves can be linked. For example, the details of characteristics 4003 of the above example could be elevated to be characteristics instead of details of a characteristic, which the user could select for example from pull down menus and link using 4004.

The search result is displayed 4100. The display may be a headline, sub-headline, first paragraph, or summary paragraph. The user can evaluate the search result 4440 and request the next search 4600. Alternatively, he can ask for another suggestion 4460.

The system can learn from past searches, which results for same or similar question seem to be better fits. This can be done based on direct feedback 4440 and/or indirect feedback such as for example by observing the frequency a request to see the full article, download the article, or other indication that this search result might be of value to user.

FIG. 9 and FIG. 10 provide another example of an application of the invention, also illustrating additional features. Today's methods to find flight information on-line require the user to answer a number of questions and then a price optimized solution is given to the user. They do not allow the user to follow up with a simple trade-off analysis, provide guidance of how possibly to reduce the price, or allow to fine tune the search algorithm. For example can the user save money by changing the departure date, length of stay, depart from a different airport nearby or how much more is it if user selects the airline where she is enrolled in the frequent flier program, if she selects a routing with no stops, if she upgrades to business class, etc. These are questions people typically ask the travel agent. Furthermore, the user might want to eliminate from the search all flights which are already booked out because they are alternatives that are no longer available to the user and therefore of no value.

The user fills in the flight information 5001 (FIG. 9) for the characteristics. For the price range 5100 (FIG. 9 and FIG. 10) the user can either select a target price 5101 (FIG. 10), or an algorithm such as 5102 (FIG. 10). Such an algorithm could be "lowest price possible, allowed to change all unlocked characteristic as needed," "lowest price as is, assumes for this one iteration that all characteristics are locked". In this example, selecting the type of algorithm is more useful than selecting a target price. The user can further fine tune the search by selecting the option of excluding "booked out" flights 5003 (FIG. 9). The user can save the search result 4460 (FIG. 9) and add the result to a comparison table 4480 (FIG. 9).

It is evident that the user can conduct trade-off analysis easily starting from any solution offered. Assume the user starts with the solution shown in FIG. 9., a non-stop flight from San Francisco to Frankfurt for $1295 flight. The user can now analyze how much could be saved by making one or several stops. The user can now unlock the restriction on stops 5004 (FIG. 9). The user would find out (not shown) that the price would be reduced to $980 using United Airlines with one stop. The user, could now select and lock American Airlines, her frequent flier program of choice and find out that the price differential is only $50 above the $980 quoted by United, with still one stop, but a few more restrictions. Finally the user could ask the system to find the lowest cost solution, allowing to change all unlocked characteristics. The result may be a flight departing from Oakland, with two stops and a return date five days later than requested, however at $496. The user can then view all of above selections in a comparison table, putting her in a position to easily select the most attractive solution for her. The item identified by numeric designator 5200 is a further example of a feature, the user can provide the maximum deviation which is acceptable, such as plus or minus three days as shown.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A search apparatus, comprising:
   an item database which contains an item for which a search is to be performed, wherein each item has an associated characteristic, wherein similar items are structured along a same characteristic, and wherein it is not necessary that all items of an item group have all the same characteristics;
   a logic module for determining those items that must be searched for in said item database;
   wherein said logic module searches said item database;
   a presentation module for displaying a search result; and
   means for allowing a user to lock certain characteristics for said search by said logic module;
   wherein said logic module attempts to fulfill higher level, more important characteristics first, violating lower level characteristics if there is differentiation in importance of characteristics.

2. The apparatus of claim 1, further comprising:
   a user database for storing user searches, wherein said user database stores historically most popular characteristic or characteristics which may include those which fit to a profile of a user, those which are known through available user data, those which are previously provided directly or indirectly by said user, or those which are deducted from earlier selection of characteristics.

3. The apparatus of claim 1, said presentation module further acting as an input for additional searches.

4. The apparatus of claim 1, wherein each item stored in said item database comprises a complete product or service.

5. The apparatus of claim 1, wherein information describing a characteristic of an item is attached to each characteristic, wherein such information can be any length and any format.

6. The apparatus of claim 1, wherein said characteristics are differentiated by importance in hierarchies.

7. The apparatus of claim 1, wherein an item is a sub-item that is defined as a combination of other items, and wherein said sub-items are further characteristics of said item.

8. The apparatus of claim 1, wherein each item is dynamically generated and/or created based on logic module rules contained in said logic module, and wherein a dynamically generated item is created by combining separate characteristics to create one complete item that comprises desired characteristics.

9. The apparatus of claim 1, wherein each item is a combination of some characteristics which are fixed and other characteristics that can be added dynamically.

10. The apparatus of claim 1, said logic module further comprising logic module rules that describe how to arrive at a characteristic.

11. The apparatus of claim 1, wherein an item, characteristic, and information describing a characteristic searched for can reside on different databases and/or Web sites.

12. The apparatus of claim 1, wherein characteristics can reside on multiple databases and/or Web sites.

13. The apparatus of claim 1, wherein an item can be tagged on-the-fly.

14. The apparatus of claim 1, wherein said presentation module further comprises any of:
  a description of an item;
  a characteristic;
  information;
  an action; and
  a locking function that allows a user to lock in characteristics which are desired.

15. The apparatus of claim 14, wherein said description can be text based, a picture, video, sound, or a combination thereof.

16. The apparatus of claim 14, wherein said characteristics and said information describe an item shown along with said characteristics.

17. The apparatus of claim 14, wherein said action allows search parameters for a next search to be changed by a user.

18. The apparatus of claim 17, wherein said action may be executed by any of a pull down menu, yes and no questions, multiple choice questions, and ratings.

19. The apparatus of claim 1, further comprising:
  a new search button that allows a user to select a next iteration to find a better fitting solution.

20. The apparatus of claim 1, further comprising:
  a rating function for allowing a user to rate a search.

21. The apparatus of claim 1, further comprising:
  means for allowing a user to move away from a next best fitting iteration to a totally new starting point in the search.

22. The apparatus of claim 1, further comprising:
  means for allowing a user to select or build/customize an algorithm.

23. The apparatus of claim 1, wherein said presentation module is configured such that a display is not needed.

24. The apparatus of claim 1, wherein said logic module is adaptive, wherein search results improve over time as said logic module learns about a user and develops a user profile.

25. The apparatus of claim 24, wherein user profile information is acquired directly from either of questions asked of said user or a third party.

26. The apparatus of claim 1, wherein said logic module is self personalizing, wherein said logic module collects and analyzes history about a user, has said user react to solutions, and learns from those reactions.

27. The apparatus of claim 1, wherein said logic module is also profiling, wherein said logic module learns from all searches of all users and combines a user profile and patterns of similar users.

28. The apparatus of claim 1, wherein said item database is a virtual database in which items reside on many remote Web sites and/or databases; and wherein a smart agent finds desired items in said virtual database.

29. The apparatus of claim 1, wherein said logic module substitutes a next best solution for locked characteristics.

30. The apparatus of claim 1, wherein said logic module bundles search results with other items.

31. The apparatus of claim 1, wherein said logic module provides a save search result function that allows a user to begin an alternative search.

32. The apparatus of claim 1, wherein said presentation module displays several search results in a tabular form.

33. The apparatus of claim 1, wherein said logic module allows a user to include and/or exclude any of various characteristics.

34. The apparatus of claim 1, wherein said logic module allows various characteristics to be detailed by said user.

35. The apparatus of claim 1, wherein said logic module allows said user to determine the logical relationship to each other of details of characteristics and/or characteristics themselves.

36. A search method, comprising the steps of:
  providing an item database which contains an item for which a search is to be performed, wherein each item has an associated characteristic, wherein similar items are structured along a same characteristic, and wherein it is not necessary that all items of an item group have all the same characteristics;
  providing a logic module for determining those items that must be searched for in said item database;
  wherein said logic module searches said item database;
  providing a presentation module for displaying a search result; and
  providing means for allowing a user to lock certain characteristics for said search by said logic module;
  wherein said logic module attempts to fulfill higher level, more important characteristics first, violating lower level characteristics if there is differentiation in importance of characteristics.

37. The method of claim 36, further comprising the step of:
  providing a user database for storing user searches, wherein said user database stores historically most popular characteristics or such characteristics as those which fit to a profile of a user, those which are known through available user data, those which are previously provided directly or indirectly by said user, or those which are deducted from earlier selection of characteristics.

38. The method of claim 36, wherein said presentation module acts as an input for additional searches.

39. The method of claim 36, further comprising the steps of:
  initiating a search;
  using a search engine to select an initial search result as a starting point;
  listing the most important characteristic for a subsequent search result;

wherein a next response is a search result that fits well to a new set of characteristic; and wherein said search engine uses an internal algorithm to fit in missing information if said user has not specified said characteristics using preselected, default, or most appropriate values; and said user optionally selecting a next result/search algorithm.

40. The method of claim 39, wherein said starting point is context based.

41. The method of claim 39, wherein said initial search result is selected at random, preset default characteristics or results are provided, or said initial search result is selected from historically most popular characteristics or such characteristics as those which fit to a profile of a user, those which are known through available user data, those which are previously provided directly or indirectly by said user, or those which are deducted from earlier selection of characteristics.

42. The method of claim 39, further comprising any of the steps of:

selecting a result; and pointing out a violation to said user if certain characteristics are locked, or if user chosen characteristics conflict with each other;

wherein said user can reject a result offered and a new result is then generated violating a different characteristic without changing said locking.

43. The method of claim 39, further comprising the step of:

generating results using a conjoint analysis algorithm, wherein at least some of the solutions generated are not a best fitting solution, but a solution selected to help assess a user's preferences and relative importance of said characteristics.

44. The method of claim 39, further comprising the step of:

ordering said results to a fit of characteristics and allows the user to scroll through them in sequential order.

45. The method of claim 39, further comprising the step of:

displaying a comparison table of a present and a previous search.

46. The method of claim 39, further comprising the step of:

asking said user to provide an indication of importance of characteristics when presented with a solution.

47. The method of claim 39, further comprising the step of:

providing a user database that contains all historic data about users and searches.

48. The method of claim 47, wherein said data includes information about a user where such information is collected based on searches conducted, third party information acquired about said user, information about profiles of users or user groups against which a profile of a specific user can be measured, and information about what items a user having a similar profile has obtained.

49. The method of claim 47, wherein said database comprises a plurality of databases that are distributed over a network and connected to each other.

50. The method of claim 36 wherein said item database is a virtual database in which items reside on many remote Web sites and/or databases; and wherein a smart agent finds desired items in said virtual database.

51. The method of claim 37, wherein said user database is a virtual database in which information about user reside on many remote Web sites and/or databases; and wherein a smart agent finds desired user information in said virtual database.

52. The method of claim 36, wherein said logic module substitutes a next best solution for locked characteristics.

53. The method of claim 36, wherein said logic module bundles primary search results with secondary items.

54. The method of claim 36, wherein said logic module provides a save search result function that allows a user to begin an alternative search.

55. The method of claim 36, wherein said logic module allows a user to include and/or exclude any of various characteristics.

56. The method of claim 36, wherein said logic module allows various characteristics to be detailed by said user.

57. The method of claim 36, wherein said logic module allows said user to determine the logical relationship to each other of details of characteristics and/or characteristics themselves.

* * * * *